United States Patent [19]
Ehrsam et al.

[11] 3,958,081
[45] May 18, 1976

[54] BLOCK CIPHER SYSTEM FOR DATA SECURITY

[75] Inventors: William Friedrich Ehrsam, Hurley; Carl H. W. Meyer, Kingston; Robert Lowell Powers, West Hurley; Paul Norman Prentice, Hyde Park; John Lynn Smith; Walter Leonard Tuchman, both of Woodstock, all of N.Y.

[73] Assignee: International Business Machines Corporation, Armonk, N.Y.

[22] Filed: Feb. 24, 1975

[21] Appl. No.: 552,685

[52] U.S. Cl. ............................. 178/22; 340/172.5
[51] Int. Cl.² ................................................ H04K 1/00
[58] Field of Search ............... H04L/9/02; 178/22; 340/172.5

[56] References Cited
UNITED STATES PATENTS

| | | | |
|---|---|---|---|
| 3,798,359 | 3/1974 | Feistel | 178/22 |
| 3,798,360 | 3/1974 | Feistel | 178/22 |

OTHER PUBLICATIONS

"Communication Theory of Secrecy Systems," Shannon, *Bell System Technical Journal,* Vol. 28, pp. 656–715, 1949.
"Cryptography and Computer Privacy, Feistel," *Scientific American,* Vol. 228, No. 5, pp. 15–23, 1973.

*Primary Examiner*—Howard A. Birmiel
*Attorney, Agent, or Firm*—Edwin Lester

[57] ABSTRACT

A device for ciphering message blocks of data bits under control of a cipher key. The cipher device performs an enciphering process for each message block of data by carrying out a predetermined number of iteration operations in the first of which a first half of the message block of data bits is first expanded by duplicating predetermined ones of the data bits. The data bits of the expanded message block are combined by modulo-2 addition with an equal number of cipher key bits, selected in accordance with an arbitrary but fixed permutation, to produce a plurality of multi-bit segments forming the arguments for a plurality of different nonlinear substitution function boxes. The substitution boxes perform a plurality of nonlinear transformation functions to produce a substitution set of bits which are equal in number to the number of data bits in the first half of the message block. The substitution set of bits is then subjected to a linear transformation in accordance with an arbitrary but fixed permutation. The combined nonlinear transformation and linear transformation results in a product block cipher of the first half of the message block. The second half of the message block is then modified by modulo-2 addition with the product block cipher of the first half of the message block to produce a modified second half of the message. The modified second half of the message block then replaces the first half of the message block which at the same time replaces the second half of the message block in preparation for the next iteration operation. During the next iteration operation, the cipher key bits are shifted according to a predetermined shift schedule to provide a new set of permuted cipher key bits. The modified second half of the message block is then used with the new set of permuted cipher ket bits in a similar product block cipher operation, the result of which is used to modify the first half of the message block. The modified first half of the message block then replaces the modified second half of the message block which at the same time replaces the first half of the message block in preparation for the next iteration operation. During each of the remaining iteration operations of the enciphering process except the last, the cipher key bits are shifted according to the predetermined shift schedule, a modified half of the message block is remodified according to a product block cipher of the previously modified half of the message block and the resulting remodified half of a message block is effectively transposed with the previously modified half of the message block. During the last iteration operation, the cipher key bits are shifted a last time according to the shift schedule and a last remodification of a modified half of the message block is performed according to a product block cipher of the previously modified half of the message block but the resulting remodified half of the message block and the previously modified half of the message block are not transposed and now constitute the enciphered version of the original message block. Deciphering an enciphered message block is carried out by the same series of iteration operations under control of the same cipher key shifted during the iteration operations according to a predetermined shift schedule in a direction opposite to that in the enciphering process to reverse the enciphering process and undo every iteration that was carried out in the enciphering process to produce a resulting message block identical with the original message block.

16 Claims, 20 Drawing Figures

*ENCIPHER/DECIPHER DEVICE

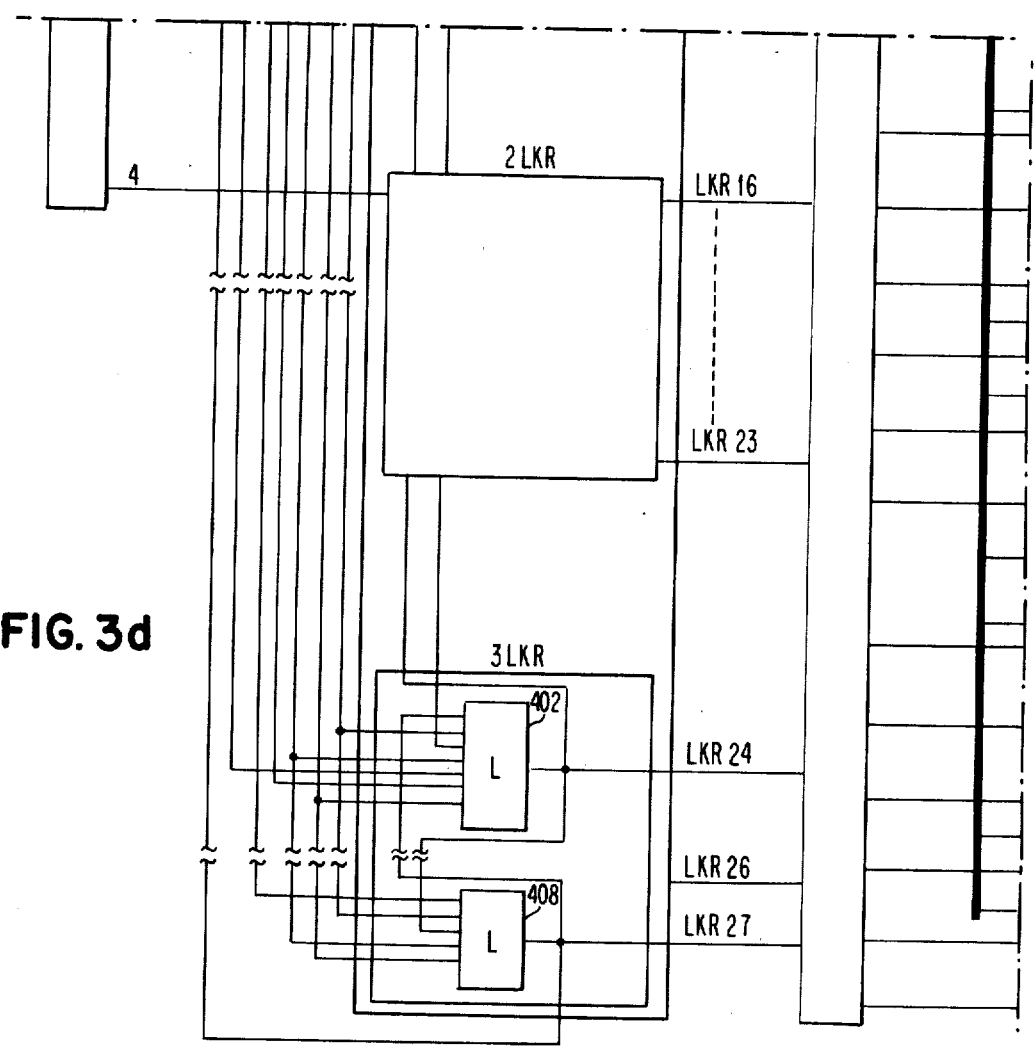

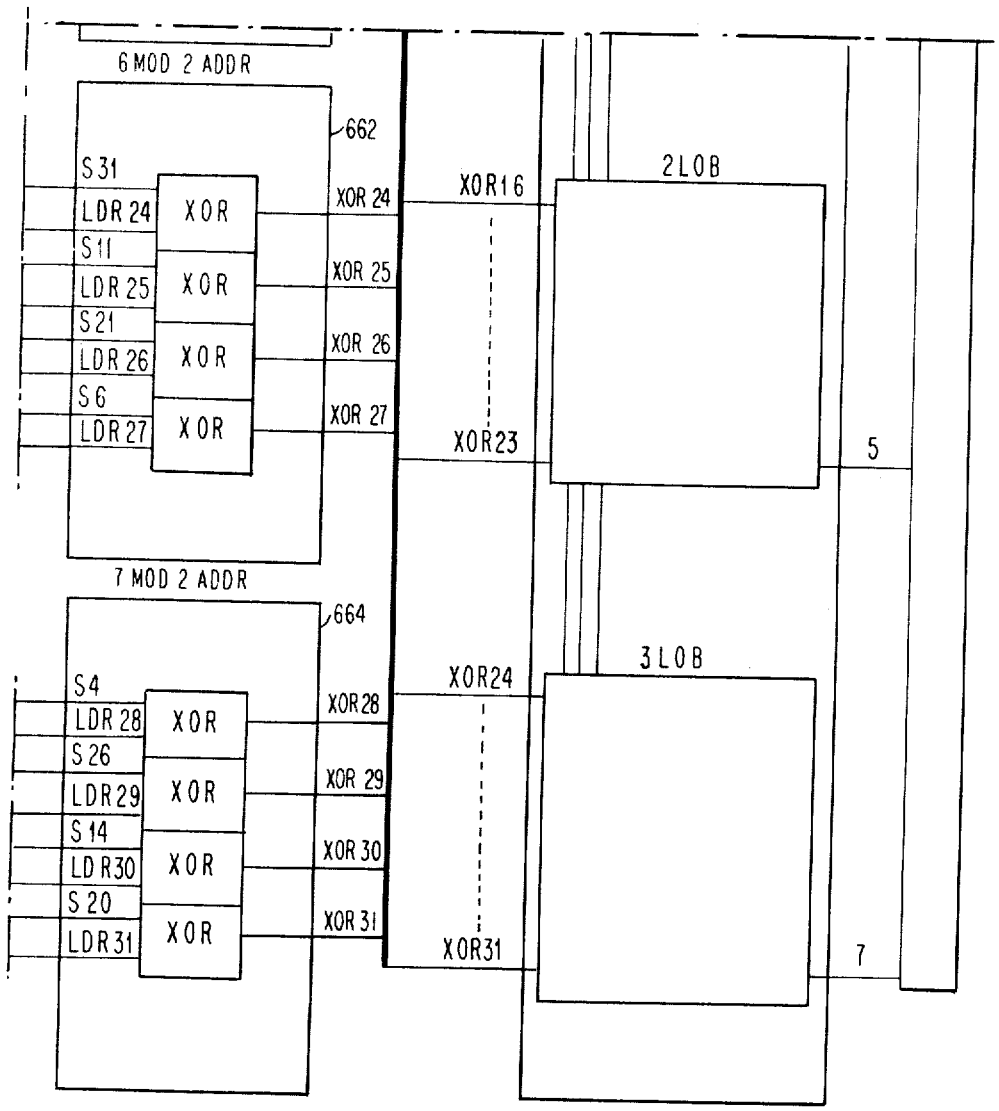
FIG. 3j
FIG. 7
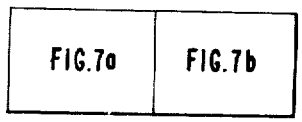

BLOCK CIPHER SYSTEM FOR DATA SECURITY

CROSS REFERENCE TO RELATED APPLICATION

Reference is hereby made to application Ser. No. 552,684 of W. F. Ehrsam et al filed concurrently herewith and entitled "Product Block Cipher System For Data Security" which discloses a product block cipher arrangement utilized in the present application to encipher or decipher message blocks of data and is assigned to the same assignee as the present application.

BACKGROUND OF THE INVENTION

This invention relates to a cipher device for utilization within a data processing environment and, more particularly, to a cipher device for performing a product block ciphering process for enciphering and deciphering digital data to ensure complete security and privacy of data within a data processing environment.

With the increasing use of telecommunications in computer system networks, the very long cable connections between terminals or I/O devices and control units and the removability of storage media, there is an increasing concern over the interception or alteration of data because physical protection cannot normally be guaranteed. Cryptography has been recognized as one type of mechanism for achieving data security and privacy in that it protects the data itself rather than the medium of transmitting the data.

Various systems have been developed in the prior art for enciphering messages to maintain the security and privacy of data communications. One such system is the block cipher system, which is a substitution technique, in which the entire block is enciphered in accordance with a predetermined cipher key. The resulting substituted message is unintelligible ciphertext which cannot be understood without knowledge of the cipher key. An advantage of the substitution technique operating in accordance with a predetermined cipher key is that the deciphering operation is easily implemented by a reverse application of the cipher key. Further teachings on the design and principles of substitution techniques may be found in "Communication Theory of Secrecy Systems" by C. E. Shannon, Bell System Technical Journal, Vol. 28, pages 656–715, Oct. 1949, and in "Cryptography and Computer Privacy" by H. Feistel, Scientific American, Vol. 228, No. 5, pages 15–23, May 1973. Both Shannon and Feistel expound on a product cipher system in which two or more ciphers are successively combined, as for example, by successive stages of nonlinear substitution followed by linear transformation.

Various product ciphering systems have been developed in the prior art for improving the security and privacy of data within a data processing system. U.S. Pat. No. 3,798,359 issued Mar. 19, 1974 relates to a product cipher system which combines linear and nonlinear transformations of a cleartext message with the transformations being a function of a cipher key. In addition to controlling the transformation, the cipher key also controls various register substitutions and modulo-2 additions of partially ciphered data within the ciphering system. However, the system disclosed in this patent does not disclose any of the details of the precise mapping of cipher key bits by the key router to the modulo-2 adders, the details of the particular nonlinear transformation carried out internal to the substitution function boxes or the particular permutation carried out by the diffuser, all of which have a significant effect on the quality of the cipher operation. Also, the cipher key is divided into small groups with the cipher key bits within each group being shifted for each iteration of the cipher operation. Because the size of the group is small, the effect of each group of cipher key bits is restricted over a limited area of the cipher operation which also has a significant effect on the quality of the cipher operation. Additionally, only two types of substitution function boxes are used in this system selected as a function of a cipher key bit only which likewise has a significant effect on the quality of the cipher operation.

Related to this patent is U.S. Pat. No. 3,796,830 issued Mar. 12, 1974 which is also directed to a product cipher system in which the block of cleartext is processed on a segmented basis with each segment being serially transformed in accordance with a portion of the cipher key. However, the system disclosed in this patent is serial in nature which reduces throughput speed and if rearranged to a parallel block system would add significant complexity to the hardware implementation of such a system. Furthermore, this system like that of the related patent is limited to only two types of substitution function boxes selected as a function of a cipher key bit only which likewise has a significant effect on the quality of the cipher operation.

SUMMARY OF THE INVENTION

In the present invention, a cipher device is provided for enciphering or deciphering a 64-bit message block under control of an arbitrarily chosen cipher key. The cipher device performs an enciphering process by carrying out a series of 16 iteration operations in the first of which a first half of the message block, consisting of 32 data bits, considered as 8 segments of 4 data bits each, is expanded into 48 data bits consisting of 8 segments of 6 data bits each, the expansion being accomplished by duplicating the end data bits of each of the 8 4-bit segments. The expanded 48 data bits considered as 8 6-bit segments are then combined in parallel by modulo-2 addition with 48 cipher key bits considered as 8 6-bit cipher key bit segments, selected in accordance with an arbitrary but fixed permutation, with the resulting 8 6-bit segments forming the actual arguments for 8 nonaffine transformation functions. In each of the 8 transformation functions, the end bits of the applied 6-bit segment, resulting from the modulo-2 addition of a duplicated end bit of the preceding 6-bit data segment and a permuted cipher key bit and from the modulo-2 addition of a duplicated end bit of the succeeding 6-bit data segment and a different permuted cipher key bit, are effectively decoded to select 1 of 4 16-entry function tables, each entry consisting of 4 bits. One of the 16 4-bit entries in the selected function table is then selected by effectively decoding the remaining inner 4-bits of the 6-bit segment. The function tables of the 8 transformation functions are different from each other, thereby providing 8 different transformation functions resulting in 8 4-bit segments defining a substitution set of 32 bits. The substitution set of 32 bits is then subjected to a linear transformation by an arbitrary but fixed permutation, the combined nonlinear transformation and linear transformation resulting in a product block cipher of the 32-bit first half of the message block. The 32-bit second half of the message block is then modified by modulo-2 addition with the 32-bit product block cipher of the first half of the message block to produce a 32-bit modified second half of the message block. The 32-bit modified second half of the message block then replaces the first half of the message block which at the same time replaces the 32-bit second half of the message block. In the next iteration operation, the cipher key is shifted in accordance with the predetermined shift schedule to provide a new set of cipher key bits. The 32-bit modified second half of the message block is then used with the new set of cipher key bits in a similar product block cipher operation to modify the 32-bit first half of the message block. The process of remodifying alternate halves of the message block continues in successive iterations during each of which the cipher key bits are selectively shifted a predetermined amount according to the shift schedule to provide a new set of cipher key bits.

The cipher operation described above, carried out in a series of 16 iterations in accordance with a product block cipher algorithm, may be defined in terms of a cipher function and a key schedule function. Thus, in the enciphering operation, if the 64-bit input message block consists of a 32-bit block L and a 32-bit block R, then the input message block may be denoted by the term LR. Also, if the block of cipher key bits is chosen from a cipher key KEY, then the block of cipher key bits may be denoted by the term K. Therefore, for all iterations except the last, the output of an iteration with an input of LR may be denoted by the term $L'R'$ and may be defined as follows:

$$L' = R$$

$$R' = L \oplus f(R, K) \quad (1)$$

where $\oplus$ denotes a bit-by-bit modulo-2 addition and before each iteration a different block K of cipher key bits is chosen from the cipher key KEY. Since the output is transposed after each iteration except the last, then the output of the last iteration with an input of LR may be denoted by the term $L'R'$ and may be defined as follows:

$$L' = L + f(R, K)$$

$$R' = R \quad (2)$$

Additionally, if a key schedule KS is defined as a function of an integer $n$ in the range from 1 to 16 and the cipher key KEY, then the permuted selection of cipher key bits from the cipher key KEY may be denoted by the term $K_n$ and defined as follows:

$$K_n = KS(n, KEY) \quad (3)$$

Then, if $L_o$ and $R_o$ and L and R, respectively, and $L_n$ and $R_n$ are $L'$ and $R'$, respectively, when $L_{n-1}$ and $R_{n-1}$ are L and R, respectively, then the output of an iteration when $n$ is in the range from 1 to 15 may be defined by:

$$L_n = R_{n-1}$$

$$R_n = L_{n-1} \oplus f(R_{n-1}, K_n) \quad (4)$$

Since the output is transposed after each iteration except the last, then the output of the last iteration when $n$ is equal to 16 may be defined by:

$$L_n = L_{n-1} \oplus f(R_{n-1}, K_n)$$

$$R_n = R_{n-1} \quad (5)$$

In the enciphering operation $K_1$ is used in the first iteration, $K_2$ in the second, and so on, with $K_{16}$ used in the 16th iteration. See FIG. 8 for a block diagram of the enciphering operation.

The cipher functions $f(R,K)$ may be defined in terms of primitive functions called selection functions and permutation functions. Thus, if a 32-bit block R is expanded to a 48-bit block, then the expanded block may be denoted by the term E(R). The expanded block E(R) is then combined by modulo-2-addition with a block of cipher key bits k, selected in accordance with an arbitrary but fixed permutation, to produce 8 6-bit segments, B1, B2, B3, B4, B5, B6, B7 and B8, forming the arguments for 8 different distinct selection functions S1, S2, S3, S4, S5, S6, S7 and S8. Therefore, the modulo-2 addition may be defined as follows:

$$E(R) \oplus K = B1, B2, B3, B4, B5, B6, B7 \text{ and } B8 \quad (6)$$

Each distinct selection function $S_i$ transforms a distinct 6-bit segment $B_i$ into a 4-bit segment whereby the 8 distinct selection functions may be defined as S1(B1), S2(B2), S3(B3), S4(B4), S5(B5), S6(B6), S7(B7) and S8(B8). The 8 4-bit segment outputs of the 8 selection functions are then consolidated into a single 32-bit block which is permuted by a permutation function P into a new 32-bit block defined as follows:

$$P(S1(B1), S2(B2), S3(B3), S4(B4), S5(B5), S6(B6), S7(B_7), S8(B8)) \quad (7)$$

which represents the cipher function $f(R,K)$.

Deciphering a 64-bit enciphered message block under control of the same cipher key is accomplished through the same series of 16 iterations during which the cipher key is shifted in a direction opposite to that of the enciphering process by one or two bit positions according to the predetermined shift schedule. This assures proper alignment of the cipher key bits during the deciphering iterations to undo every iteration that was carried out in the enciphering operation and produce a resulting 64-bit message block identical with the original message block.

The deciphering operation described above, carried out in a series of 16 iterations in accordance with a product block cipher algorithm, may also be defined in terms of a cipher function and key schedule function. Thus, if a 64-bit enciphered input message block consists of a 32-bit block $L'$ and a 32-bit block $R'$, then the enciphered input message block may be denoted by the term $L'R'$. Therefore, the output of the first iteration with an input of $L'R'$ may be denoted after being transposed by the term LR and may be defined as follows:

$$L = L' \oplus f(R', K)$$

$$R = R' \quad (8)$$

where after each iteration a different block K of cipher key bits is chosen from the cipher key KEY in the reverse order in which it is chosen for the enciphering operation. After the first iteration, each succeeding iteration is transposed except the last, then the output of each succeeding iteration with an input of $L'R'$ may be denoted by the term LR and may be defined as follows:

$$L = R' \oplus f(L', K)$$

$$R = L' \tag{9}$$

Then, if $L_n$ and $R_n$ are $L$ and $R$, respectivelyy, and $L_{n-1}$ and $R_{n-1}$ are $L'$ and $R'$, respectively, the output of the first iteration when $n$ is equal to 16 may be defined as follows:

$$L_{n-1} = L_n \oplus f(R_n, K_n)$$

$$R_{n-1} = R_n \tag{10}$$

Since the output is transposed after each iteration except the last, then the output of each succeeding iteration when $n$ is in the range from 15 to 1 may be defined as follows:

$$L_{n-1} = R_n \oplus f(L_n, K_n)$$

$$R_{n-1} = L_n \tag{11}$$

In the deciphering operation, $K_{16}$ is used in the first iteration, $K_{15}$ in the second, and so on, with $K_1$ used in the 16th iteration. See FIG. 8 for a block diagram of the deciphering operation.

In a data processing environment, a sending station performs an enciphering process in which a product block cipher of a first half of a message block is achieved by first modifying the first half of the message block in accordance with a permuted cipher key, followed by a nonlinear substitution and linear permutation, the result of which is used to modify the second half of the message block. The modified second half of the message block and the original first half of the message block are then interchanged so that modified second half of the message block serves as the argument for an iteration of the product block cipher operation under control of the permuted cipher key shifted, however, in accordance with a predetermined shift schedule, to modify the first half of the message block. Sixteen iterations of the product block cipher operation are executed, in which the result of one serves as the argument of the next and at the end of which the result constitutes the enciphered version of the original message block. At a receiving station, a deciphering process is performed under control of the same cipher key in a similar manner by 16 iterations of the product block cipher operation with the cipher key being shifted in a direction opposite to that in the enciphering process to undo every iteration that was carried out in the enciphering process and produce a resulting message block identical to that of the original message block.

Accordingly, it is an object of this invention to provide a system capable of maintaining the security of data within a data processing environment.

Another object of this invention is to provide a cipher device for message blocks of data wherein the cipher is developed under control of a cipher key shifted according to a predetermined shift schedule.

A further object of the invention is to provide a ciphering system for message blocks of data in which a cipher of a message block of data is carried out by a predetermined number of iterations of a product block cipher operation with the result of one iteration serving as the argument for the next iteration.

Still another object of the invention is to provide a ciphering system for message blocks of data in which a cipher of a message block of data is carried out by a predetermined number of iterations of a product block cipher operation under control of a cipher key which is shifted in a predetermined direction and in accordance with a predetermined shift schedule during the iterations of the cipher operation.

Still a further object of the invention is to provide an enciphering system for message blocks of data in which the enciphering of a message block of data is carried out by a predetermined number of iterations of a product block cipher operation under control of a cipher key which is shifted in a predetermined direction and in accordance with a predetermined shift schedule during iterations of the encipher operation so that different cipher keys are used during the iterations of the encipher operation.

Still another object of the invention is to provide a deciphering system for enciphered message blocks of data in which the deciphering of an enciphered message block of data is carried out by a predetermined number of iterations of a product block cipher operation under control of a cipher key which is shifted according to a predetermined shift schedule during deciphering iterations but in a direction opposite to that in which the message block of data is enciphered.

Still a further object of the invention is to provide a ciphering process for message blocks of data which is carried out by a series of product block cipher operations performed under control of a cipher key shifted according to a predetermined shift schedule.

Still another object of the invention is to provide an enciphering process for message blocks of data in which alternate halves of each message block are modified by a predetermined number of product block cipher operations performed under control of a cipher key shifted according to a predetermined shift schedule.

Still a further object of the invention is to provide a deciphering process for enciphered message blocks of data in which alternate halves of each enciphered block are modified by a predetermined number of product block cipher operations performed under control of the same cipher key that was used to encipher the message block shifted according to a predetermined shift schedule but in a direction opposite to that in enciphering the message block.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 3 is a diagram of how FIGS. 3a through 3j may be placed to form a composite block diagram.

FIGS. 3a through 3j, taken together, comprise a detailed schematic diagram of the ciphering device of the present invention.

FIG. 7 illustrates how FIGS. 7a and 7b may be placed to form a composite timing diagram.

GENERAL DESCRIPTION OF THE DISCLOSED EMBODIMENT

Figure 1:
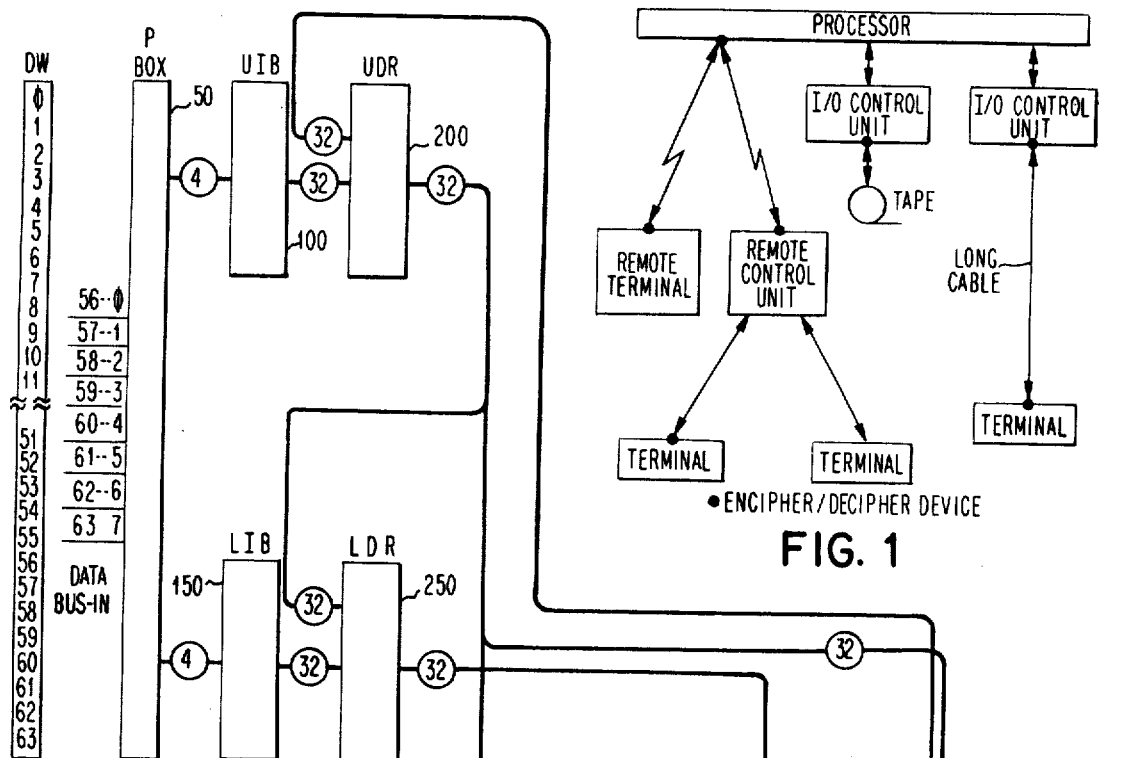
FIG. 1 is a block diagram illustrating the location of cipher devices in a data processing environment.

At various locations within a data processing network physical protection of the network cannot normally be guaranteed against the interception or alteration of data or the physical removal of storage media. This problem occurs most notably in the case where data is communicated between a processor and a remote control unit or a remote terminal via telecommunication or between a control unit and terminals or I/O devices via a very long cable connection or, where removable storage media is provided. One mechanism for achieving data security and privacy in those situations is by the use of cryptographic devices located at strategic locations within the network. At the sending station clear data may be enciphered by a cipher device operating in an enciphering mode and then transmitted to a receiving station where the enciphered data may be deciphered by a cipher device operating in a deciphering mode to obtain the original clear data. Likewise, when the functions of the receiving and sending stations are reversed, the functions of the cipher devices associated with the receiving and sending station will likewise be reversed so that clear data from the receiving station, now operating as the sending station, will be enciphered and transmitted to the sending station, now operating as the receiving station where it is deciphered back to the original clear data. FIG. 1 illustrates the location of such cipher devices in a representative data processing network.

Figure 2:
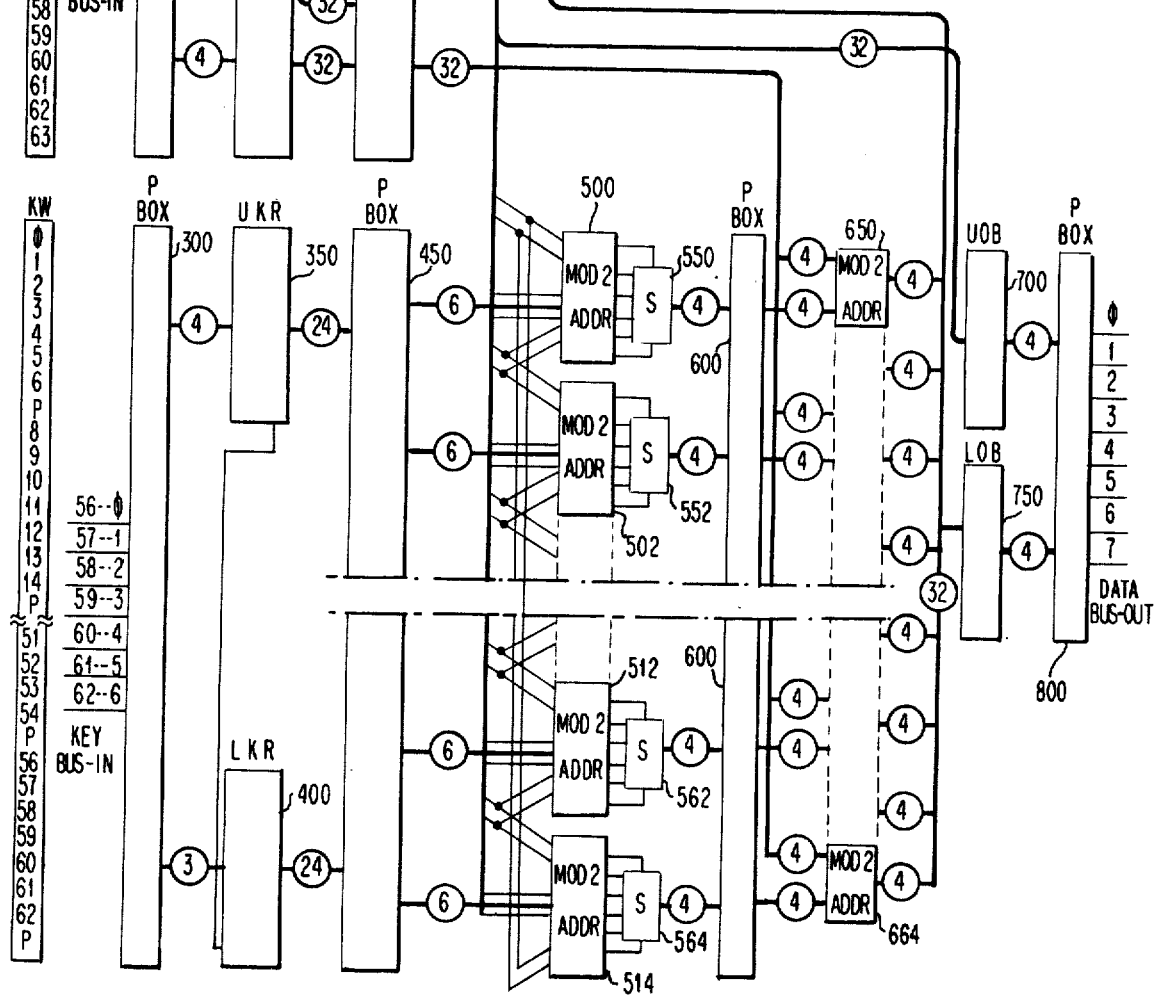
FIG. 2 is a block diagram of the cipher device of the present invention.

Referring now to FIG. 2, a block diagram of the cipher device is shown for enciphering or deciphering 64-bit message blocks of data consisting of 8 bytes with each byte containing 8 data bits. The data bytes of a message block are applied serially, a byte at a time, via the data bus-in to the cipher device, necessitating 8 cycles to completely transmit the message block of 64 data bits. Each byte of data bits received by the cipher device is subjected to an initial linear permutation accomplished by ordinary wire crossings hereinafter designated by a P box, e.g. P box 50. Following this, each permuted byte of data is divided into two halves with the even data bits $\phi$, 2, 4 and 6 being applied to an upper input buffer (UIB) 100 and the odd data bits 1, 3, 5 and 7 being applied to a lower input buffer (LIB) 150. The UIB 100 and LIB 150 perform a serial to parallel conversion so that after reception of the 8 bytes of the message block the UIB 100 and the LIB 150 present 2 32-bit halves of the message block in parallel to an upper data register (UDR) 200 and a lower data register (LDR) 250, respectively.

At the same time that the 64-bit message block is being received and buffered into the UIB 100 and the LIB 150, the cipher key is obtained from a 64-bit external register providing 8 bytes with each byte containing 7 key bits and a parity bit used externally as a check bit. The cipher key bytes of the cipher key, with every eighth bit (the parity bit) omitted, are applied serially, a 7-bit byte at a time, via the key bus-in to the cipher device also necessitating 8 cycles to completely transmit the cipher key. Each byte of the cipher key received by the cipher device is also subjected to an initial permutation by P box 300, after which each permuted byte of the cipher key is divided into two halves with the first 4 bits of each 7-bit byte being applied to an upper key register (UKR) 350 and the remaining 3 bits being applied to a lower key register (LKR) 400. The UKR 350 and LKR 400 each contain 28 stages with a connection from the last stage of the UKR 350 to the twenty-fifth stage of the LKR 400 and performs a serial to parallel conversion so that during the serial reception of the 8 7-bit bytes considered as 7 groups of 8 bits each, 3 of the 7 groups of the serially received 8 bits at stages $\phi$, 8, and 16 of the UKR 350 and 3 other of the 7 groups of the serially received 8 bits at stages $\phi$, 8 and 16 of the LKR 400 are each converted to 3 parallel groups of 8 bits which may be considered as 2 parallel groups of 24 bits in the UKR 350 and the LKR 400. The remaining group of the 7 groups of 8 bits is serially received at stage 24 of the UKR 350. The connection between the last stage of the UKR 350 and stage 24 of the LKR 400 permits the first 4 bits of the remaining group of 8 bits serially received by the UKR 350 to be passed to the LKR 400 so that during reception of the group of 8 bits, the first 4 bits are converted a parallel subgroup of 4 bits in the last 4 stages of the LKR 400 and the second 4 bits are converted to a parallel subgroup of 4 bits in the last 4 stages of the UKR 350. The UKR 350 and the LKR 400 now contain the cipher key considered as 2 parallel groups of 28 bits each.

At this point, the first and second half of the message block are transferred to the UDR 200 and the LDR 250 and the cipher key is contained in the UKR 350 and LKR 400. Once the UKR 350 and LKR 400 are loaded, the connection between the two registers is no longer used and the UKR 350 and LKR 400 operate as two independent 28-bit shift registers. In an enciphering process, a series of 16 iterations is carried out, prior to which the cipher key contents of the UKR 350 and the LKR 400 are preshifted by one bit position. During the iteration operations of the enciphering process except the first the cipher key contents of UKR 350 and LKR 400 are shifted by one or two bit positions. This procedure assures proper alignment of the cipher key bits as each register is always shifted exactly 28 positions according to a predetermined shift schedule.

In the first iteration of the enciphering process, the first half of the message block contained in the UDR 200, consisting of 32 data bits considered as 8 segments of 4 data bits each, is expanded into 48 data bits consisting of 8 segments of 6 data bits each, the expansion being accomplished by duplicating the end bits of each of the 8 4-bit segments. The expanded 48 data bits now considered as 8 6-bit segments are then applied, in parallel, to 8 modulo-2 adders 500 to 514, each consisting of 6 exclusive OR's. At the same time, a selected set of 48 predetermined ones of the 56 cipher key bits, 24 selected from the UKR 350 and 24 from the LKR 400, are linearly permuted in P box 450 by a predetermined fixed permutation and applied as 8 segments of 6 cipher key bits, in parallel, to the exclusive OR's of the 8 modulo-2 adders 500 to 514. The 8 modulo-2 adders 500 to 514 effectively combine the expanded 48 data bits, considered as 8 6-bit segments, in parallel, with the permuted 48 cipher key bits, considered as 8 6-bit segments, with the resulting 8 6-bit segments forming the actual arguments for 8 nonaffine substitution function boxes 550 to 564 hereinafter designated as S boxes in each of which a nonlinear transformation function is carried out. In each S box the end bits of the applied 6-bit segment, resulting from the modulo-2 addition of a duplicated end bit of the preceding 6-bit data segment and a permuted cipher key bit and from the modulo-2 addition of a duplicated end bit of the succeeding 6-bit data segment and a different permuted cipher key bit, are effectively decoded to select 1 of 4 16-entry function tables contained in a read only storage (ROS) within the S box, each entry consisting of 4 bits. One of the 16 4-bit entries in the selected function table is then selected by effectively decoding the remaining inner 4 bits of the applied 6-bit segment. The 8 S boxes are different from each other, thereby providing 8 different transformation functions resulting in 8 4-bit segments defining a substitution set of 32 bits. The substitution set of 32 bits is then subjected to a linear transformation by an arbitrary but fixed permutation in P box 600, the combined nonlinear transformation and linear transformation resulting in a 32-bit product block cipher of the first half of the message block which is applied to the modulo-2 adders 650 to 664. The 32 data bits of the second half of the message block in the LDR 250 are also applied to the modulo-2 adders 650 to 664 which then modifies the 32-bit second half of the message block from LDR 250 in accordance with the 32-bit product block cipher of the first half of the message block from the P box 600, the result of which is 8 4-bit groups comprising a new set of 32 bits representing a modified second half of the message block. The 32-bit modified second half of the message block is applied to replace the 32-bit first half of the message block contained in the UDR 200 which at the same time is transferred to replace the 32-bit second half of the message block presently contained in the LDR 250. During the next iteration of the enciphering operation, the cipher key presently stored in the UKR 350 and the LKR 400 is shifted in accordance with the predetermined shift schedule to provide a new permuted set of cipher key bits. The 32-bit modified second half of the message block presently stored in the UDR 200 is then used with the new set of permuted cipher key bits in a similar product block cipher operation, the result of which is used by the modulo-2 adders 650 to 664 to modify the 32-bit first half of the message block presently stored in the LDR 250. The 32-bit modified first half of the message block from the modulo-2 adders 650 to 664 is then applied to replace the 32-but modified second half of the message block contained in UDR 200 which at the same time is transferred to replace the 32-bit first half of the message block presently contained in LDR 250. During each of the remaining iteration operations of the enciphering process except the last, the cipher key bits in UKR 360 and LKR 400 are shifted according to the predetermined shift schedule to provide a new set of permuted cipher key bits, a 32-bit modified half of the message block stored in LDR 250 is remodified according to a 32-bit product block cipher of the previously modified half of the message block stored in the UDR 200 and the resulting 32-bit remodified half of a message block from the modulo-2 adders 650 to 664 is applied to replace the previously modified 32-bit half of the message block contained in UDR 200 which at the same time is transferred to replace the contents of LDR 250. During the last iteration operation, the cipher key bits in UKR 350 and LKR 400 are shifted a last time according to the shift schedule to provide a last set of permuted cipher key bits and a last remodification of a 32-bit modified half of the message block stored in LDR 250 is performed according to a 32-bit product block cipher of the previously modified half of the message block stored in UDR 200 but the resulting 32-bit remodified half of the message block from the modulo-2 adders 650 to 664 and the 32-bit previously modified half of the message block stored in UDR 200 are not transposed and now constitute the 64-bit enciphered version of the original message block. After the sixteenth iteration, the 32-bit contents of the UDR 200 and the 32-bit output of the modulo-2 adders 650 to 664, representing the enciphered message block of data, are transferred to an upper output buffer (UOB) 700 and a lower output buffer (LOB) 750, respectively. The 64-bit enciphered block of data consisting of 4 8-bit bytes of enciphered data stored in the UOB 700 and 4 8-bit bytes of enciphered data stored in the LOB 750, is then subjected to a parallel to serial conversion on each 8-bit byte of enciphered data and applied, an 8-bit byte at a time, to a P box 800, necessitating 8 cycles to completely transmit the 64-bit enciphered message block of data. Each byte of enciphered data is subjected to a final linear permutation to connect the enciphered data bits to the proper bit lines of the data bus-out for transmission to a receiving station.

At a receiving station, deciphering the 64-bit enciphered message block of data under control of the same cipher key is accomplished through the same series of 16 iterations. However, no preshift of the cipher key contents of UKR 350 and LKR 400 is performed, as in the enciphering process, prior to the deciphering process. During the iteration operations of the deciphering process except the first the cipher key contents of UKR 350 and LKR 400 are shifted according to a predetermined shift schedule by one or two bit positions, as in the enciphering process, but in a direction opposite to that in the enciphering process to reverse the enciphering process and undo every iteration that was carried out in the enciphering process to produce a resulting 64-bit message block which is identical to the original 64-bit message block. Additionally, the cipher key content of UKR 350 and LKR 400 is shifted 27 bit positions during the iteration operations of the deciphering process. Consequently, since UKR 350 and LKR 400 are 28-bit shift registers, at the end of the deciphering process, the cipher key content of UKR 350 and LKR 400 are postshifted by one more bit position. This permits the cipher key to be shifted a complete revolution through the UKR 350 and LKR 400 shift registers according to the predetermined shift schedule to assure proper alignment of the cipher key bits during each iteration of the deciphering process and in preparation for another deciphering process.

DETAILED DESCRIPTION OF DISCLOSED EMBODIMENT

Figure 7A:
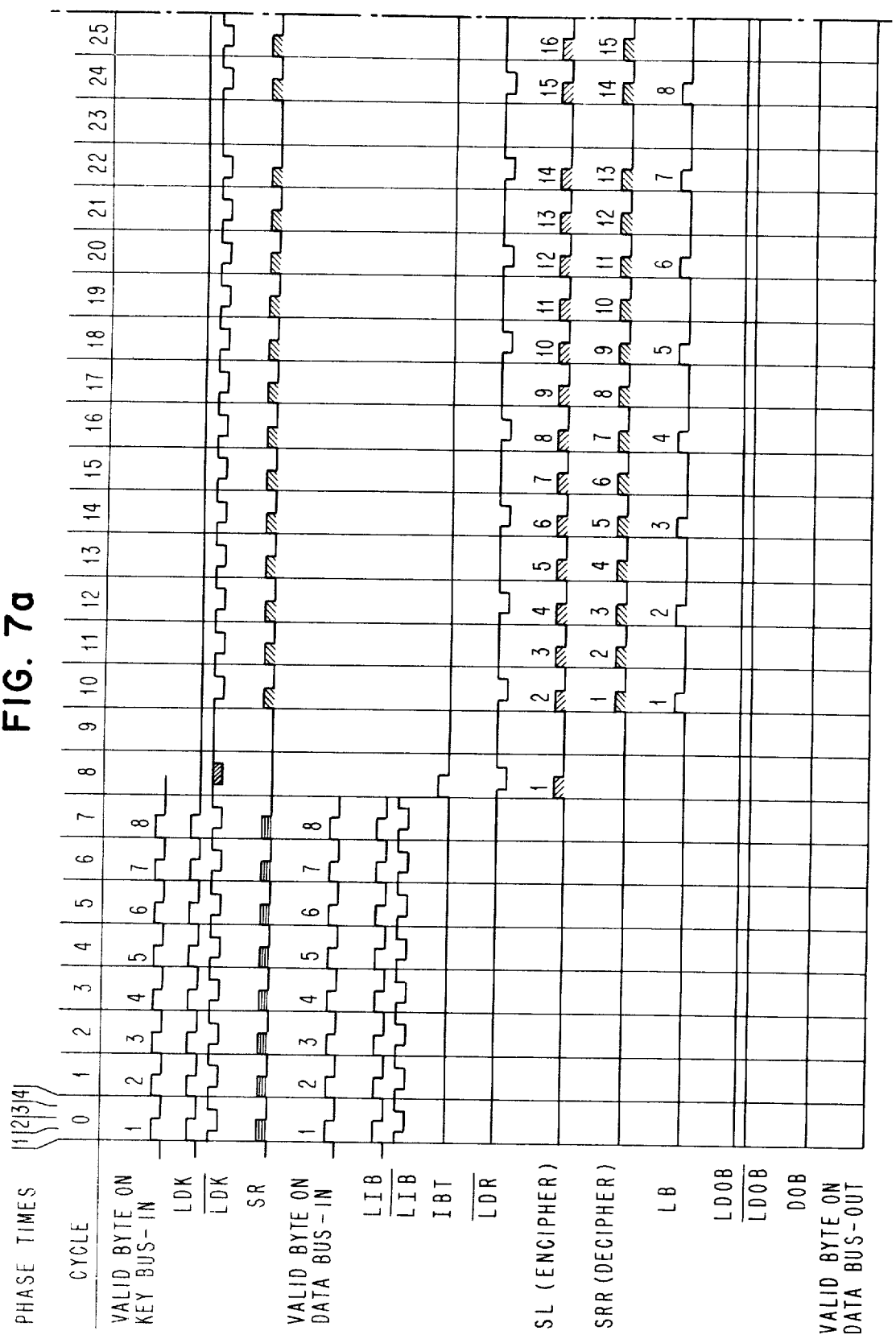
FIGS. 7a and 7b, taken together, comprise a timing diagram of the enciphering and deciphering operation.
Figure 7B:
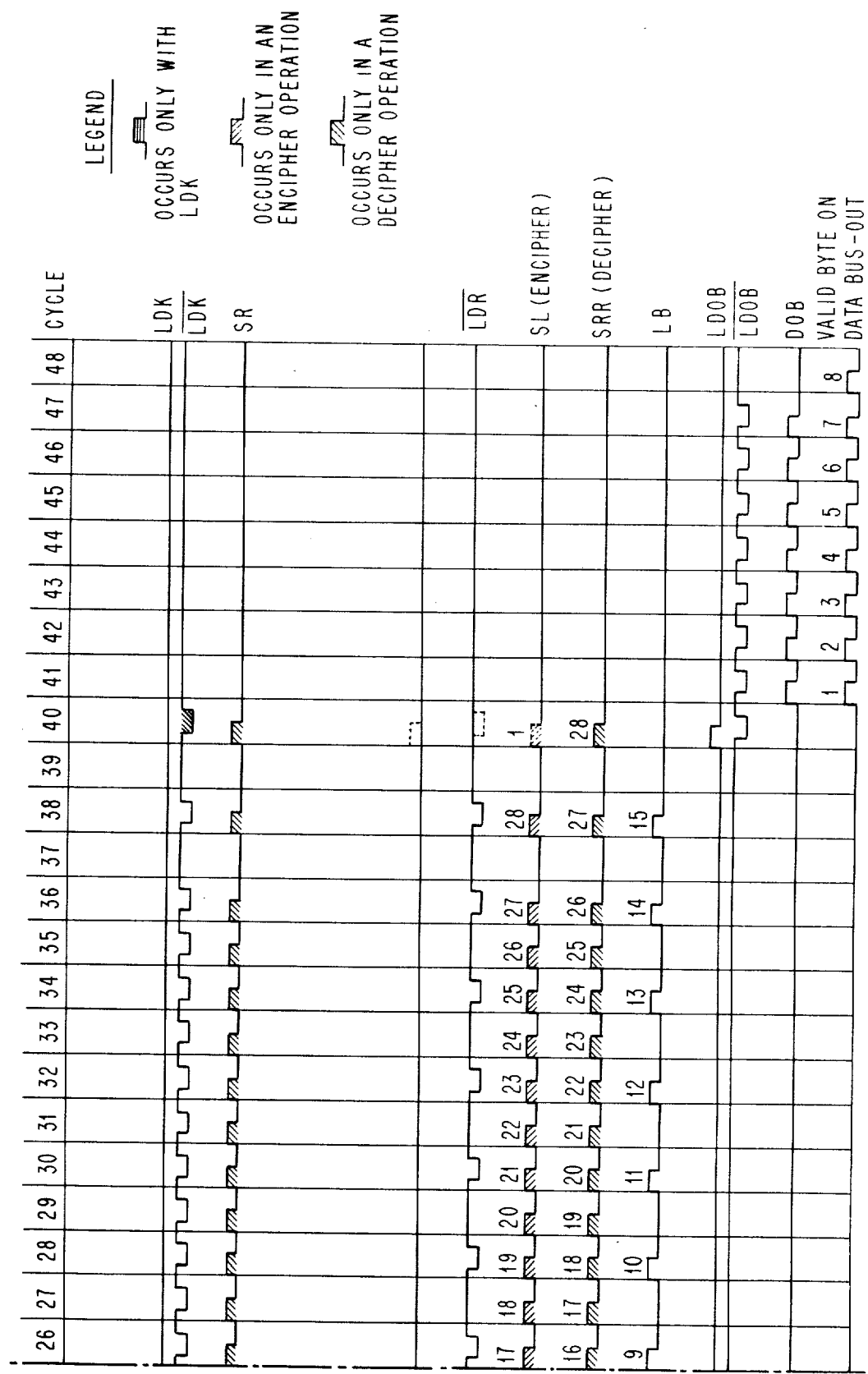
Figure 8:
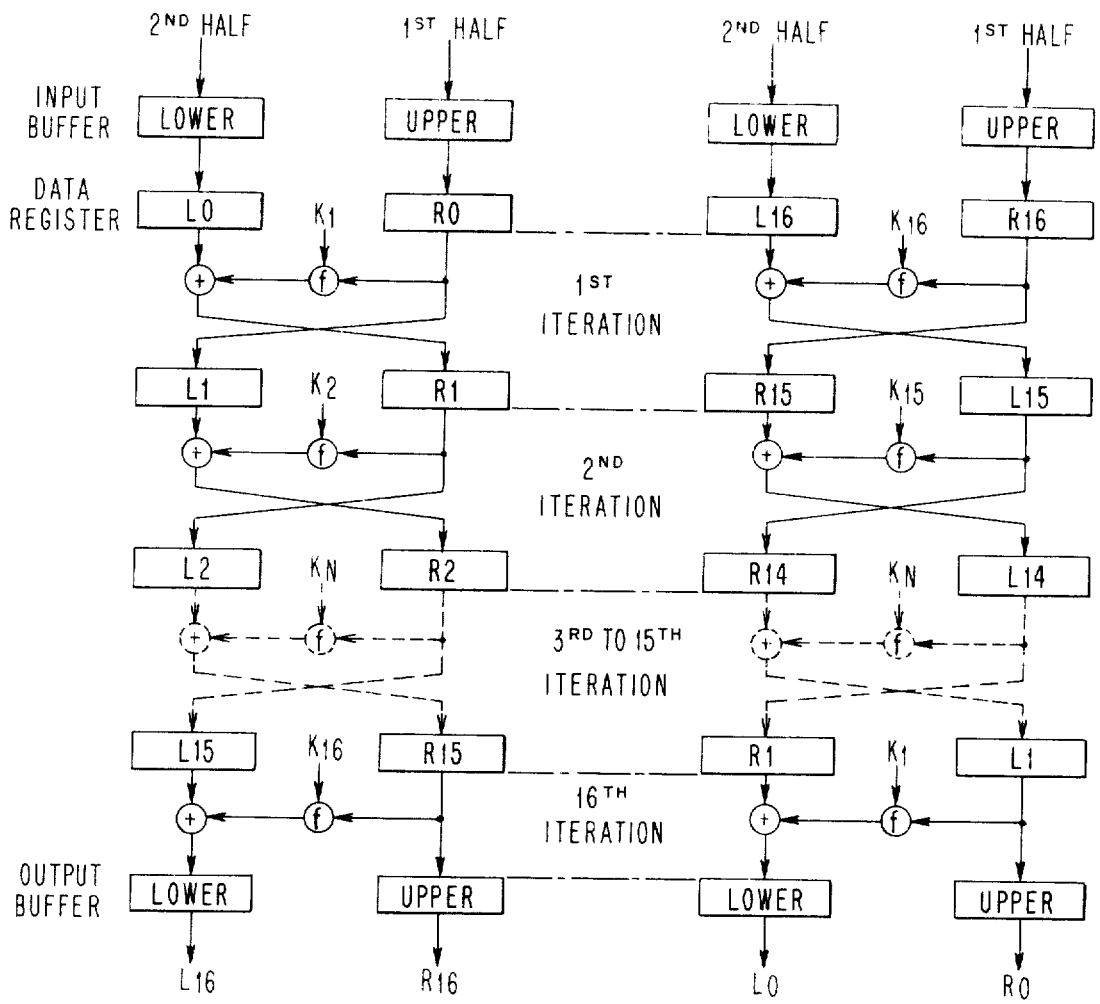
FIG. 8 is a block diagram of the enciphering and deciphering process.

Referring now to FIGS. 3*a* through 3*j*, taken together, a detailed schematic diagram of the cipher device of the present invention is shown and a detailed description will follow taken in connection with the timing diagrams of FIGS. 7*a* and 7*b*.

Figure 4:
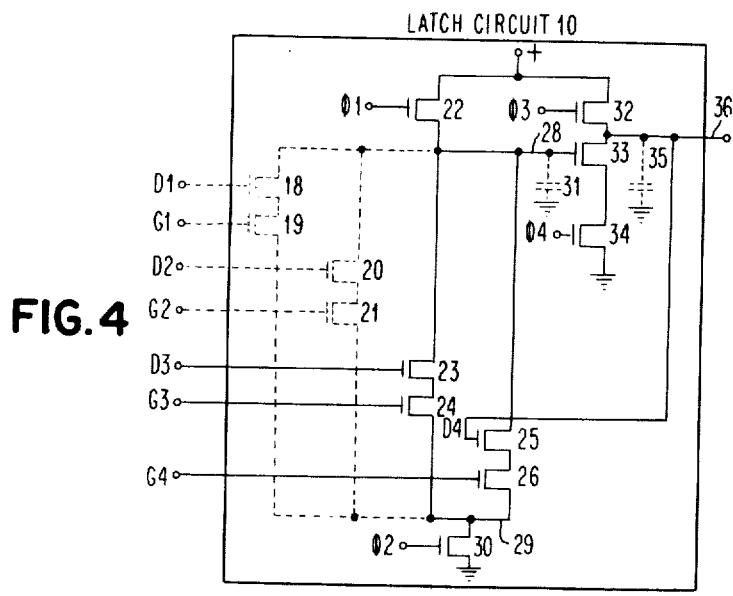
FIG. 4 illustrates the logic details of a latch circuit used in the present invention.

Before proceeding to a detailed description of the cipher device, refer to FIG. 4 which illustrates the logic detail of a latch circuit used throughout the present invention. The latch circuit 10 may be implemented with dynamic FET circuits operating with a 4 clock phase timing with each phase being 250 nanoseconds in duration giving a total of 1 microsecond for a complete clock cycle. The basic latch circuit consists of device 22 connected between a plus source and line 28 and having a gate electrode connected to receive a recurring clock signal $\phi1$; parallel pairs of serially connected devices 23 and 24 and 25 and 26, respectively, connected between lines 28 and 29 with each pair having gate electrodes connected to receive inputs D3 and G3 and inputs D4 and G4, respectively; a device 30 connected between line 29 and ground and having a gate electrode connected to receive a recurring clock signal $\phi2$; a group of 3 serially connected devices 32, 33 and 34 connected between the plus source and ground and each having a gate electrode respectively connected to a recurring clock signal $\phi3$, line 28 and a recurring clock signal $\phi4$ and the connection between devices 32 and 33 taken as the output line 36 of the latch circuit 10 and fed back as input D4 to the gate electrode of device 25. The stray and inter-electrode capacitances within the circuit are lumped together and shown as dotted capacitors 31 and 35. Devices 23 and 24 and 25 and 26 effectively function as AND circuits, line 28 as a dot OR function and device 33 as an inverter.

Figure 5:
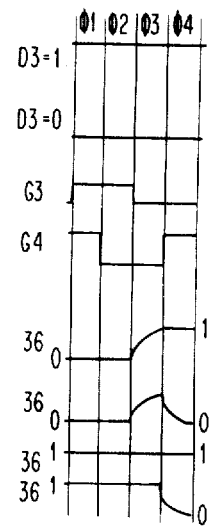
FIG. 5 comprises a series of timing diagrams explaining the operation of the latch circuit illustrated in FIG. 4.

In operation, and with reference to the timing diagrams of FIG. 5, assuming the latch circuit 10 is initially in a 0 state, then when the $\phi1$ clock signal is applied to render device 22 conductive, line 28 will be charged up to the plus source inasmuch as device 30 is nonconducting due to the absence of the $\phi2$ clock signal. When the $\phi2$ clock signal is next applied, the charge on line 28 will be maintained or discharged depending upon the signals being applied at inputs D3 and G3 or inputs D4 and G4. Since the latch circuit 10 is assumed to be in the 0 state, a lo level signal is applied at input D4 to maintain device 25 nonconducting and a lo level signal is applied to G4 to also maintain device 26 nonconducting and thereby block a discharge path through devices 25, 26 and 30. With respect to the discharge path including devices 23 and 24, if a 1 bit (hi level signal) is present at input D3 concurrently with a gate signal (hi level signal) at input G3, devices 23 and 24 conduct and provide a discharge path through device 30 thereby causing the signal on line 28 to discharge toward ground. On the other hand, if a 0-bit (lo level signal) is present at input D3 concurrently with a gate signal at input G3, then during $\phi2$ clock time device 23 will remain nonconducting to block the discharge path from line 28 through devices 24 and 30 and the hi level signal will be maintained on line 28.

When the $\phi3$ clock signal is next applied to the gate electrode of device 32, line 36 will be charged up to the plus source inasmuch as device 34 is maintained nonconducting due to the absence of a $\phi4$ clock signal. When the $\phi4$ clock signal is next applied to the gate electrode of device 34, the charge on line 36 will be maintained or discharged depending upon the level of the signal on line 28. If a lo level signal is present on line 28, representing an input of a data 1-bit, then during $\phi4$ clock time device 33 will remain nonconducting to block the discharge path from line 36 through device 34 and a hi level signal will be maintained on line 36 indicating the presence of a 1-bit. During $\phi4$ clock signal time, valid data (1) is assured at the output of the latch circuit 10. Subsequent to setting the latch circuit 10 to the data 1-bit state, the positive signal at input D4 together with the positive signal applied to input G4 are effective to maintain a discharge path for line 28 so that a lo level signal will be maintained on line 28 irrespective of the signal levels at the inputs D3 and G3. This, in turn, maintains the device 33 non conducting to thereby block the discharge path through device 34 and maintain a hi level signal on line 36 so that circuit 10 will remain latched in the data 1 bit state until such time as a new data bit is to be entered whereupon gating pulses G3 and G4 and a data bit level D3 are applied as shown in FIG. 5. On the other hand, if a hi level signal is present on line 28, representing an input of a data 0 bit then during $\phi4$ clock time, device 33 will be conducting providing a discharge path through device 34 and a lo level signal will be maintained on line 36 indicating the presence of a 0 bit. In this case, during 100 4 clock signal time, as before, valid data (0) is assured at the output of the latch circuit 10. Subsequent to setting the latch circuit 10 to the data 0-bit state, the lo level signal at input D4 is effective to maintain the device 25 nonconducting thereby blocking the discharge path for line 28 and the lo level signal at input G3 is effective to maintain device 24 non conducting thereby blocking the other discharge path for line 28 so that a charge or hi level signal is maintained on line 28. This, in turn, maintains the device 33 conducting to thereby maintain the discharge path through device 34 and maintain a lo level signal on line 36 so that circuit 10 will remain latched in the data 0 bit state until such time as a new data bit is to be entered whereupon gating pulses G3 and G4 and a data bit level D3 are applied as shown in FIG. 5. Thus, valid data is assured at the output of the latch circuit 10.

When the latch circuit 10 is in the 1 state, a clock cycle operation is initiated with a $\phi1$ clock signal applied to render device 22 conductive causing line 28 to be charged up to the plus source as before. when the $\phi2$ clock signal is next applied, the charge on line 28 will, as before, be maintained or discharged depending upon the signals being applied at inputs D3 and G3 or inputs D4 and G4. If a data 1-bit is applied at D3, a lo level signal is maintained on line 28 whereas if a data 0-bit is applied at D3 a hi level signal is maintained on line 28 as previously described. When the $\phi3$ clock signal is next applied to the gate electrode of device 32, line 36 will again be charged up to the plus source inasmuch as device 34 is maintained nonconducting due to the absence of a $\phi4$ clock signal. When the $\phi4$ clock signal is next applied to the gate electrode of device 34, the charge on line 36 will, as before, be maintained or discharged depending upon the level of the signal on line 28. If a lo level signal is present on line 28, representing an input data 1-bit then a hi level signal will be maintained on line 36 indicating the presence of a 1-bit whereas if a hi level signal is present on line 28, representing an input data 0-bit, then a lo level signal will be maintained on line 36 indicating the presence of a 0-bit, as previously described. The latch circuit 10 may be expanded to a 2-way input by the inclusion of devices 18 and 19 connected to inputs D1 and G1 or to a 3-way input by the inclusion of devices 20 and 21 connected to inputs D2 and G2. Throughout the embodiment of the present invention, which will now be described, 1-way, 2-way or 3-way input latch circuits will be utilized.

Figure 3A:
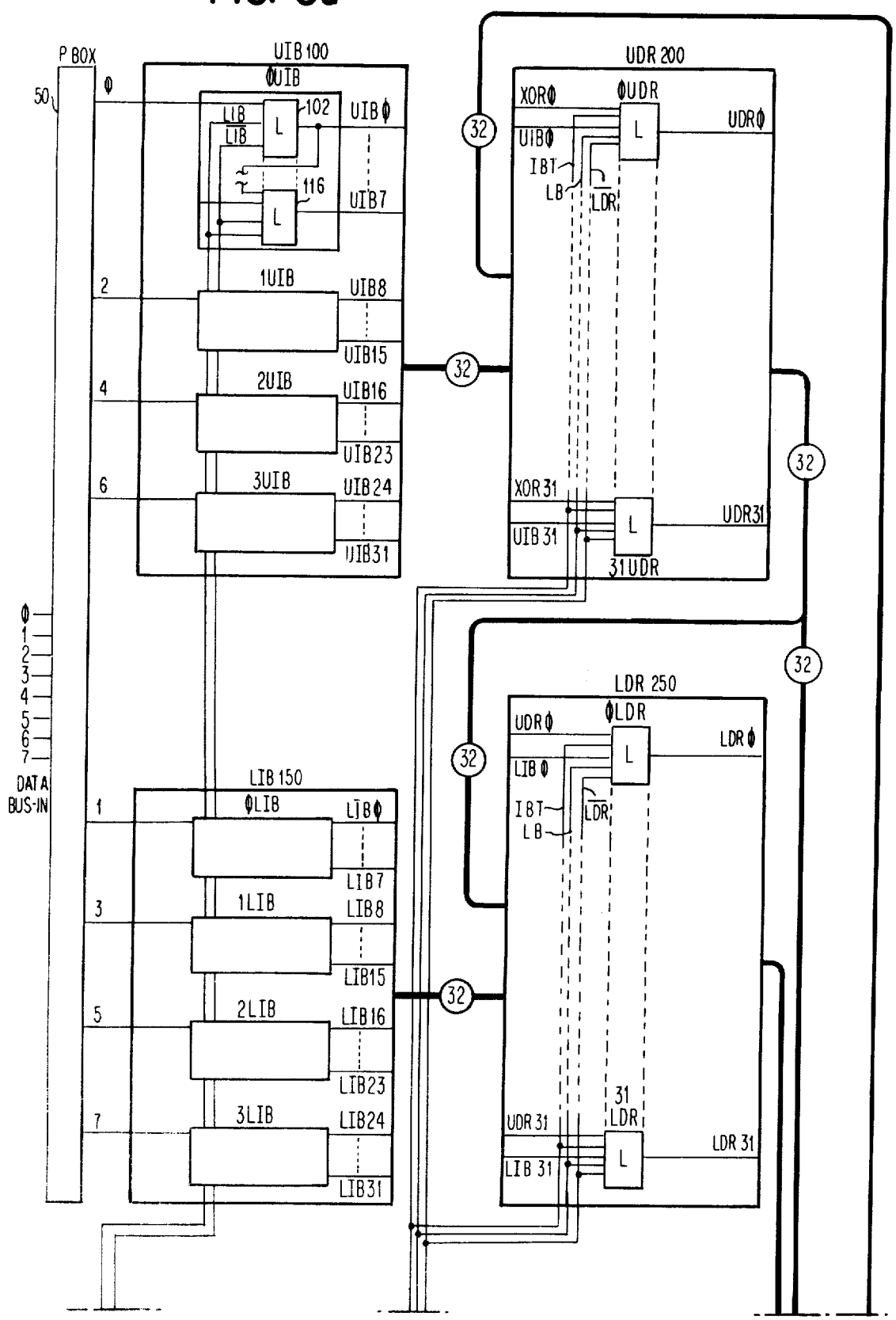

Referring now to FIG. 3a, a 64-bit message block of data consisting of 8 bytes is applied serially, a byte at a time, via the data bus-in to the P box 50. Each byte is subjected to an initial permutation by the P box 50 so that the byte of data is divided into two halves with the even data bits being applied to the UIB 100 and the odd data bits being applied to the LIB 150. The UIB 100 and LIB 150 each consist of 4 8-stage shift registers φUIB, 1UIB, 2UIB and 3UIB and φLIB, 1LIB, 2LIB and 3LIB. The first and last stages of the first shift register φUIB is shown in detail in FIG. 3a with the remaining registers being shown in block form inasmuch as they are identical in detail to that of the shift register φIUB.

Referring to the timing diagram of FIG. 7a, during cycle φ, when a valid data byte is being applied to the UIB 100 and LIB 150, via the P box 50, signals are applied on the LIB (G3) and LIB (G4) lines causing the first 8-bit byte of data to be loaded into the latches of the first stage of each of the shift registers in UIB 100 and LIB 150. During cycles 1–7, the remaining 8-bit bytes of the message block are applied, a byte at a time, to the UIB 100 and LIB 150, each bit of the byte being applied to the first stage (D3) of each of the shift registers. Since the signals on the LIB and LIB lines are applied to each stage of the shift registers, then during each of the cycles 1–7 the data bits are shifted down by one position in each of the shift registers so that at the end of cycle 7 the UIB 100 and the LIB 150 are loaded with two halves of the applied message block of data. The UIB 100 and LIB 150 effectively perform a serial-to-parallel conversion so that the 8 bytes of the message block presently stored in the UIB 100 and the LIB 150 provide 2 32-bit halves of the message block in parallel at the outputs of the UIB 100 and LIB 150.

Figure 3B:
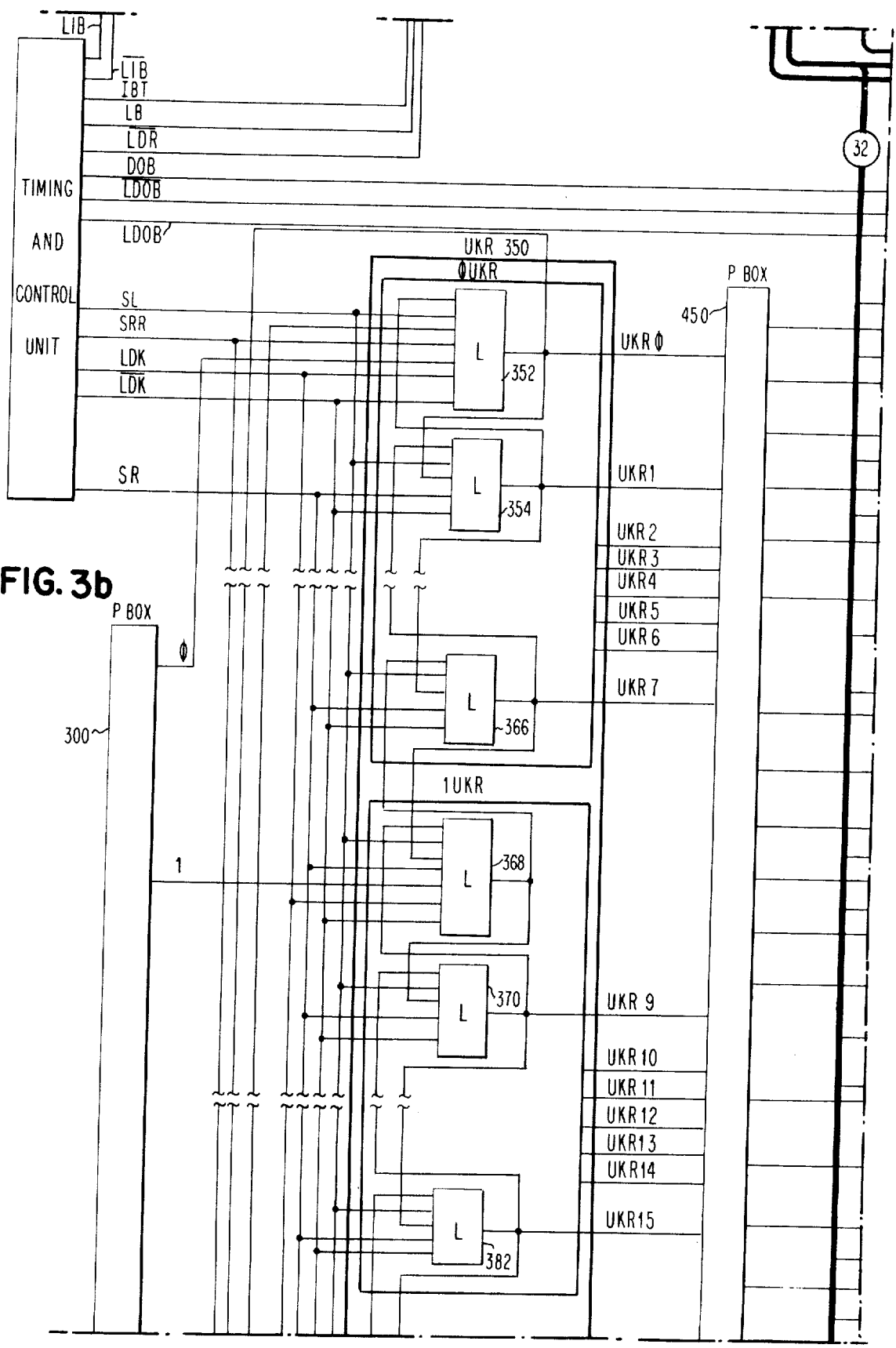
Figure 3C:
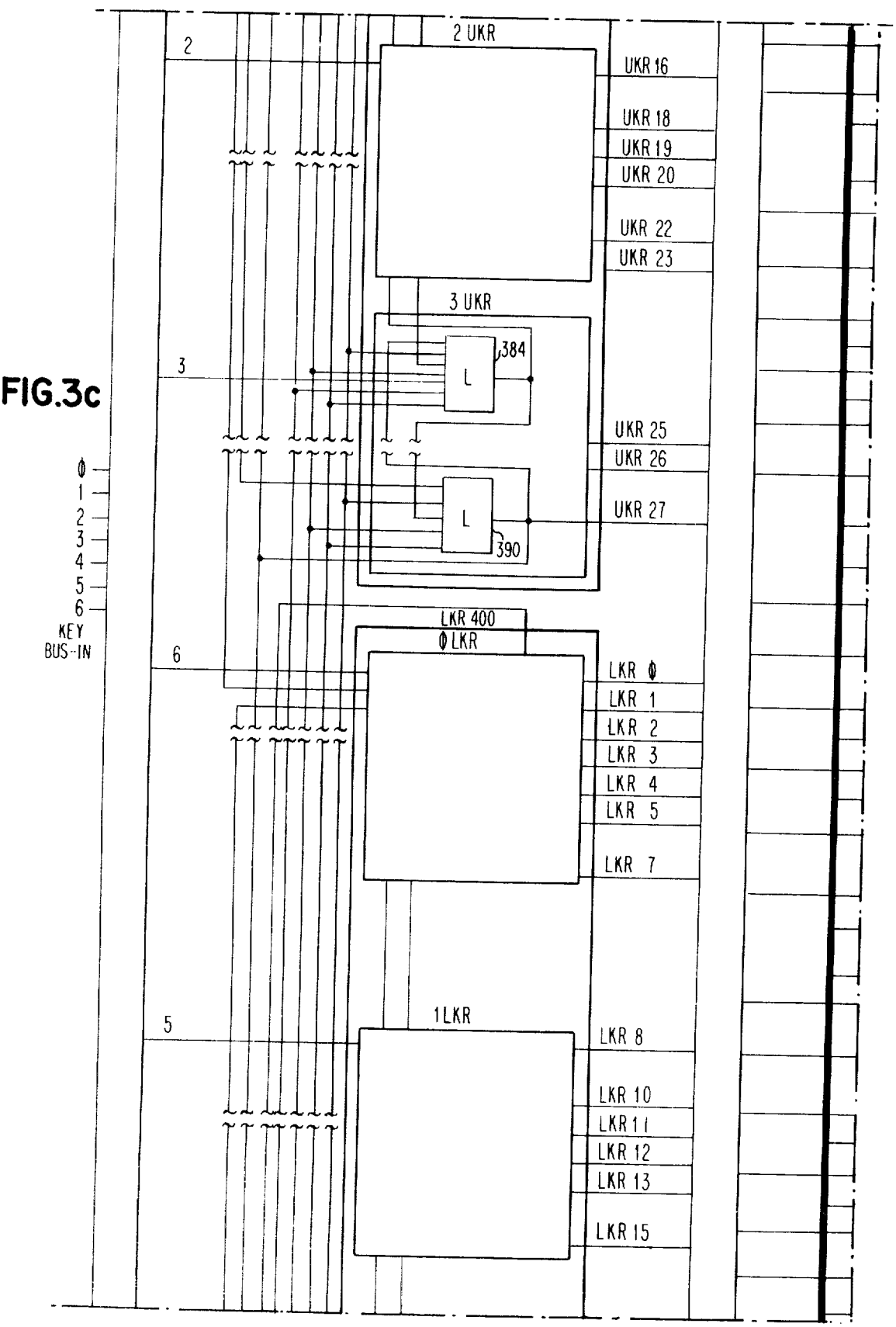

Referring now to FIGS. 3b, 3c and 3d, at the same time that the 64-bit message block is being received and buffered into the UIB 100 and the LIB 150, the cipher key is obtained from a 64-bit external register and applied serially, a 7-bit byte at a time, via the key bus-in to the P box 300. Each 7-bit byte is subject to an initial permutation by the P box 300 so that each byte is divided into two halves with the first 4 key bits being applied to the UKR 350 and the remaining 3 key bits being applied in a transposed manner to the LKR 400. UKR 350 and LKR 400 each consist of 3 8-stage shift registers φUKR, 1UKR, 2UKR and φLKR, 1LKR, 2LKR, respectively, and one 4-stage shift register, 3UKR and 3LKR, respectively, with the output of the fourth stage of the shift register 3UKR being connected to the first stage of the shift register 3LKR. The 8-stage shift register φUKR consists of one 3-way input latch 352 of the first stage and 7 2-way input latches, such as latches 354 and 366 of the second and last stages of the shift register φUKR, shown in detail in FIG. 3b. The 8-stage shift register 1UKR also consists of one 3-way input latch 368 of the first stage and 7 2-way input latches, such as latches 370 and 382 of the second and last stages of the shift register 1UKR, shown in detail in FIG. 3b. The 8-stage shift register 2UKR is shown in block form in FIG. 3c inasmuch as it is identical in detail to that of shift register 1UKR. The 4-stage shift register 3UKR consists of one 3-way iinput latch 384 of the first stage and 3 2-way input latches, such as latch 390 of the last stage of the shift register 3UKR, shown in detail in FIG. 3c. Similarly, the 8-stage shift registers φLKR, 1LKR and 2LKR of the LKR 400 are shown in block form in FIGS. 3c and 3d inasmuch as they are identical in detail to that of the corresponding 8-stage shift registers φUKR, 1UKR and 2UKR of the UKR 350. The 4-stage shift register 3LKR consists of one 3-way input latch 402 of the first stage, connected to the output of latch 390 of the last stage of shift register 3UKR, and 3 2-way input latches, such as latch 408 of the last stage of the shift register 3LKR, shown in detail in FIG. 3d. Thus, for loading purposes, the combination of the UKR 350 and the LKR 500 may be considered as consisting of 7 8-stage shift registers for storing the key bits of the cipher key word.

Referring now to FIGS. 3b, and 3c and 3d and the timing diagram of FIG. 7a, during cycle 0, when a valid cipher key byte is applied to the UKR 350 and the LKR 400, via the P box 300, signals are applied on the LDK (G3) and LDK (G4) lines connected to the first stages of shift registers φUKR, 1UKR, 2UKR, 3UKR, φLKR, 1LKR and 2LKR causing the first 7-bit key byte to be loaded into the first stages of each of the 7 shift registers in UKR 350 and LKR 400, as for example into input latches 352, 368, 384 and 402.

During cycle 1, the second of the 8 7-bit cycles of the cipher key is applied and loaded into the first stages of the 7 shift registers in UKR 350 and LKR 400. At the same time, the previous contents of these stages, namely, the first of the 8 7-bit bytes, is shifted down one bit position by signals applied on the SR (G3) and LDK lines which are connected to the second stages of shift registers φUKR, 1UKR, 2UKR, 3UKR, φLKR, 1LKR and 2LKR. The resolving time within the latch of any stage is sufficient to allow the shift operation to occur before any change occurs at the output of the latch from the preceding stage.

During cycle 2, the third of the 8 7-bit bytes of the cipher key is applied and loaded into the first stages of the 7 shift registers in UKR 350 and LKR 400. At the same time, the previous contents of the first and second stages, namely, the second and first of the 8 7-bit bytes, respectively, are shifted down 1 bit position by signals applied on the SR and LDK lines which are connected to the second and third stages of shift registers φUKR, 1UKR, 2UKR, 3UKR, φLKR, and 2LKR.

During cycles 3 and 4, the fourth and fifth of the 8 7-bit bytes of the cipher key are applied and successively loaded into the first stages of the 7 shift registers in UKR 350 and LKR 400 while the contents thereof are shifted successive 1 bit positions. However, it should be noted, referring to FIGS. 3c and 3d, that during cycle 4, the bit in the last stage of the 3UKR is shifted to the first stage of the shift register 3LKR. During cycles 5, 6 and 7, the remaining 7-bit bytes of the cipher key are applied, a 7-bit byte at a time, to the first stages of shift registers φUKR, 1UKR, 2UKR, 3UKR, φLKKR, 1LKR and 2LKR of the UKR 350 and LKR 400. Since the signals on the LDK and LDK lines are applied to the first stages of the shift registers and the signals on the SR and LDK lines are applied to the remaining stages of each of the shift registers, then during each of the cycles 5, 6 and 7, the cipher key bits are shifted down by one position so that at the end of cycle 7, UKR 350 and LKR 400 are loaded with two halves of the applied cipher key. In the loading operation, the UKR 350 and LKR 400 effectively perform a serial-parallel conversion so that the 8 7-bit bytes of the cipher key, presently stored in UKR 350 and LKR 400, may be considered as two parallel 28-bit halves. The key bit mapping tables for loading UKR 350 and LKR 400 with the cipher key is as follows:

TABLE 1

| UKR Positions | CIPHER KEY MAP FOR UKR Cipher Key Bits | | | | | | | |
|---|---|---|---|---|---|---|---|---|
| UKR 0 – UKR 7 | 56 | 48 | 40 | 32 | 24 | 16 | 8 | 0 |
| UKR 8 – UKR 15 | 57 | 49 | 41 | 33 | 25 | 17 | 9 | 1 |

TABLE 1-continued

| UKR Positions | CIPHER KEY MAP FOR UKR<br>Cipher Key Bits | | | | | | | |
|---|---|---|---|---|---|---|---|---|
| UKR 16 – UKR 23 | 58 | 50 | 42 | 34 | 26 | 18 | 10 | 2 |
| UKR 24 – UKR 27 |    |    | 59 | 51 | 43 | 35 |    |   |

TABLE 2

| LKR Positions | CIPHER KEY MAP FOR LKR<br>Cipher Key Bits | | | | | | | |
|---|---|---|---|---|---|---|---|---|
| LKR 0 – LKR 7  | 62 | 54 | 46 | 38 | 30 | 22 | 14 | 6 |
| LKR 8 – LKR 15 | 61 | 53 | 45 | 37 | 29 | 21 | 13 | 5 |
| LKR 16 – LKR 23| 60 | 52 | 44 | 36 | 28 | 20 | 12 | 4 |
| LKR 24 – LKR 27|    |    |    | 27 | 19 | 11 | 3  |   |

Referring now to FIG. 3a and the timing diagram of FIG. 7a, UDR 200 and LDR 250 each consist of 32 stages comprising latches $\phi$UDR to 31UDR and $\phi$LDR to 31LDR, respectively. During cycle 8, signals are applied to the IBT and $\overline{\text{LDR}}$ line to cause a parallel transfer of the 32 data bits in the UIB 100 and the 32 data bits in the LIB 150 to the UDR 200 and the LDR 250, respectively. Thus, the 64 bits of the message block are distributed in UDR 200 and LDR 250 as follows:

TABLE 3

| UDR Positions | DATA MAP FOR UDR<br>Data Bits | | | | | | | |
|---|---|---|---|---|---|---|---|---|
| UDR 0 – UDR 7   | 56 | 48 | 40 | 32 | 24 | 16 | 8  | 0 |
| UDR 8 – UDR 15  | 58 | 50 | 42 | 34 | 26 | 18 | 10 | 2 |
| UDR 16 – UDR 23 | 60 | 52 | 44 | 36 | 28 | 20 | 12 | 4 |
| UDR 24 – UDR 31 | 62 | 54 | 46 | 38 | 30 | 22 | 14 | 6 |

TABLE 4

| LDR Positions | DATA MAP FOR LDR<br>Data Bits | | | | | | | |
|---|---|---|---|---|---|---|---|---|
| LDR 0 – LDR 7   | 57 | 49 | 41 | 33 | 25 | 17 | 9  | 1 |
| LDR 8 – LDR 15  | 59 | 51 | 43 | 35 | 27 | 19 | 11 | 3 |
| LDR 16 – LDR 23 | 61 | 53 | 45 | 37 | 29 | 21 | 13 | 5 |
| LDR 24 – LDR 31 | 63 | 55 | 47 | 39 | 31 | 23 | 15 | 7 |

Referring now to FIGS. 3b, 3c and 3d and the timing diagram of FIG. 7a, it should be noted that no further signals are produced on LDK line. Accordingly, the connection from the last latch 390 of the shift register 3UKR to the first latch 402 of the shift register 3LKR is no longer used to transfer any bits due to the absence of any further signals applied to the LDK line. Additionally, the output of the last latch 390 in the shift register 3UKR and the output of the last latch 408 in the shift register 3LKR are connected back to the first latch 352 of the shift register $\phi$LKR, respectively. Therefore, UKR 350 and LKR 400 may be considered as two independent 28-bit shift registers. Prior to the enciphering process, the cipher key bits presently stored in UKR 350 and LKR 400 are preshifted up 1 bit position with the bit stored in the first latch 352 of UKR 350 being shifted around to the last latch 390 of UKR 350 and the bit in the first stage of the LKR 400 being shifted around to the last latch 408 of the LKR 400. This is accomplished, in cycle 8, by signals being applied to the SL and $\overline{\text{LDK}}$ lines which are connected to every stage of the UKR 350 and LKR 400. The output of every latch is connected to the preceding latch and in combination with the signals on the SL and $\overline{\text{LDK}}$ lines is effective to transfer the bit from one latch to the preceding latch. For example, the output UKR1 from the latch 354 is connected to one input of the latch 352 which in combination with the signals on the SL and $\overline{\text{LDK}}$ lines is effective to shift the bit content of latch 354 to latch 352. Similarly, the output UKR$\phi$ from the latch 352 is connected to one input of the latch 390 which, in combination with the signals on the SL and $\overline{\text{LDK}}$ lines, is effective to shift the bit content of the latch 352 to the latch 390. This preshift of the cipher key bits by one bit position before the beginning of the enciphering process assures proper alignment of the key bits in the first iteration of the enciphering process. In the ensuing enciphering process, UKR 350 and LKR 400 are shifted up by one or two bit positions during each iteration of the enciphering process except the first to provide 27 additional shifts of the cipher key bits in UKR 350 and LKR 400. Since UKR 350 and LKR 400 are 28-bit shift registers, the 28 shifts of the cipher key bits in UKR 350 and LKR 400, consisting of the 1 preshift and the 27 shifts during the enciphering process, assures proper alignment of the cipher key bits during the iteration operations as well as the beginning of the enciphering operation. The predetermined shift schedule for the cipher key is shown in the following Table 5:

TABLE 5

| ITERATION NO. | CIPHER KEY SHIFT SCHEDULE<br>ENCIPHER (SHIFT UP) | DECIPHER (SHIFT DOWN) |
|---|---|---|
|    | (Preshift) 1 |   |
| 1  | 1 | 1 |
| 2  | 2 | 2 |
| 3  | 2 | 2 |
| 4  | 2 | 2 |
| 5  | 2 | 2 |
| 6  | 2 | 2 |
| 7  | 2 | 2 |
| 8  | 1 | 1 |
| 9  | 2 | 2 |
| 10 | 2 | 2 |
| 11 |   |   |

TABLE 5-continued

| ITERATION NO. | CIPHER KEY SHIFT SCHEDULE ENCIPHER (SHIFT UP) | DECIPHER (SHIFT DOWN) |
|---|---|---|
| 12 | 2 | 2 |
| 13 | 2 | 2 |
| 14 | 2 | 2 |
| 15 | 2 | 2 |
| 16 | 1 | 1 |
|  | (Postshift) | 1 |

A one in the shift schedule of Table 5 indicates a one bit position shift in the UKR 350 and LKR 400 while a two in the table indicates two 1-bit position shifts of the UKR 350 and LKR 400.

ENCIPHERING PROCESS

An enciphering process consists of a series of 16 iteration operations to encipher a message block of data bits.

Referring now to FIGS. 3b to 3d and the timing diagram of FIG. 7a, a preshift of the cipher key bits in UKR 350 and LKR 400 is performed during cycle 8 before the enciphering process is carried out. Thus, first signals on SL and $\overline{LDK}$ lines applied to all stages of UKR 350 and LKR 400 causes a 1 bit position shift up of the cipher key in accordance with the cipher key shift schedule. This provides a valid first set of cipher key bits at the end of cycle 8 for the first iteration operation of the enciphering process. The first iteration operation of the enciphering process is carried out during cycle 9 and cycle 10 and is initiated by linearly transforming 24 of the 28 preshifted cipher key bits in UKR 350 and 24 of the 28 preshifted cipher key bits in LKR 400. The P box 450 provides an arbitrary but fixed permutation of the 48 bits from the UKR 350 and LKR 400 according to the following cipher key bit mapping Tables 6 and 7:

TABLE 6

| UKR CIPHER KEY BIT PERMUTATION MAP | |
|---|---|
| UKR BIT NO. | PERMUTED UKR BIT NO. |
| UKR 0 | UKR 13 |
| UKR 1 | UKR 16 |
| UKR 2 | UKR 10 |
| UKR 3 | UKR 23 |
| UKR 4 | UKR 0 |
| UKR 5 | UKR 4 |
| UKR 6 | UKR 2 |
| UKR 7 | UKR 27 |
| UKR 9 | UKR 14 |
| UKR 10 | UKR 5 |
| UKR 11 | UKR 20 |
| UKR 12 | UKR 9 |
| UKR 13 | UKR 22 |
| UKR 14 | UKR 18 |
| UKR 15 | UKR 11 |
| UKR 16 | UKR 3 |
| UKR 18 | UKR 25 |
| UKR 19 | UKR 7 |
| UKR 20 | UKR 15 |
| UKR 22 | UKR 6 |
| UKR 23 | UKR 26 |
| UKR 25 | UKR 19 |
| UKR 26 | UKR 12 |
| UKR 27 | UKR 1 |

TABLE 7

| LKR CIPHER KEY BIT PERMUTATION MAP | |
|---|---|
| LKR BIT NO. | PERMUTED LKR BIT NO. |
| LKR 0 | LKR 12 |
| LKR 1 | LKR 23 |
| LKR 2 | LKR 2 |
| LKR 3 | LKR 8 |
| LKR 4 | LKR 18 |
| LKR 5 | LKR 26 |
| LKR 7 | LKR 1 |
| LKR 8 | LKR 11 |
| LKR 10 | LKR 22 |
| LKR 11 | LKR 16 |
| LKR 12 | LKR 4 |
| LKR 13 | LKR 19 |
| LKR 15 | LKR 15 |
| LKR 16 | LKR 20 |
| LKR 17 | LKR 10 |
| LKR 18 | LKR 27 |
| LKR 19 | LKR 5 |
| LKR 20 | LKR 24 |
| LKR 21 | LKR 17 |
| LKR 22 | LKR 13 |
| LKR 23 | LKR 21 |
| LKR 24 | LKR 7 |
| LKR 26 | LKR 0 |
| LKR 27 | LKR 3 |

Figure 3E:
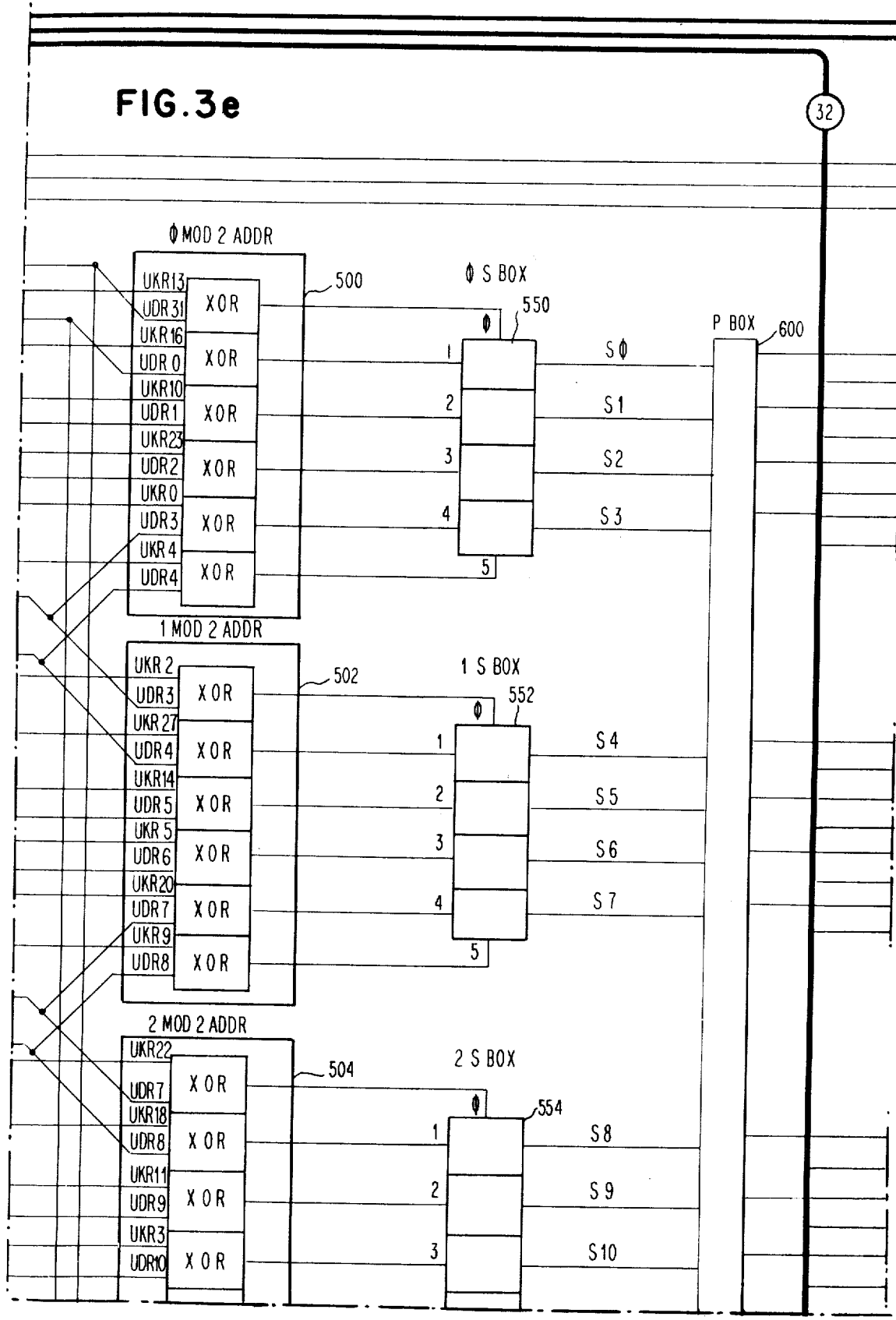
Figure 3F:
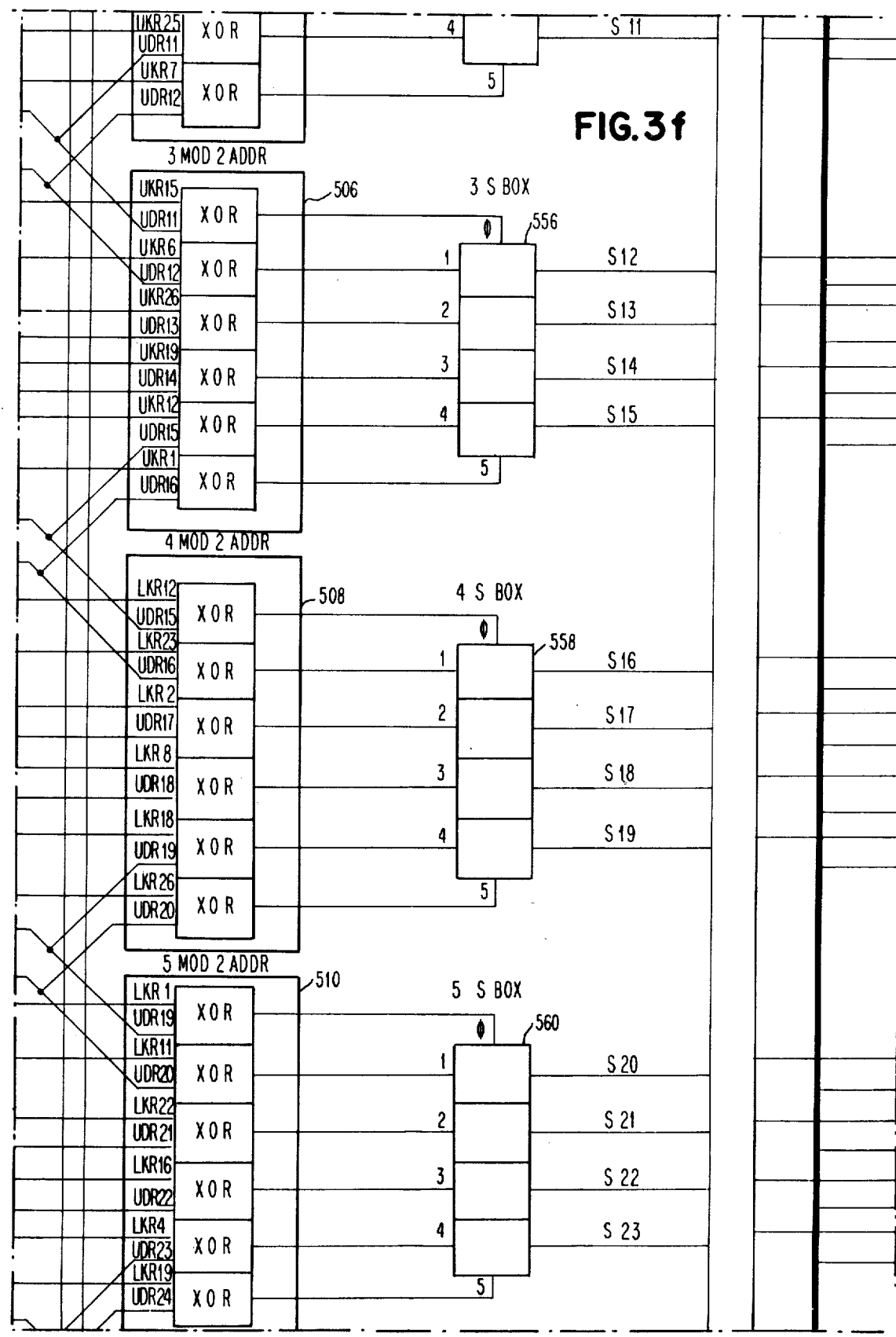
Figure 3G:
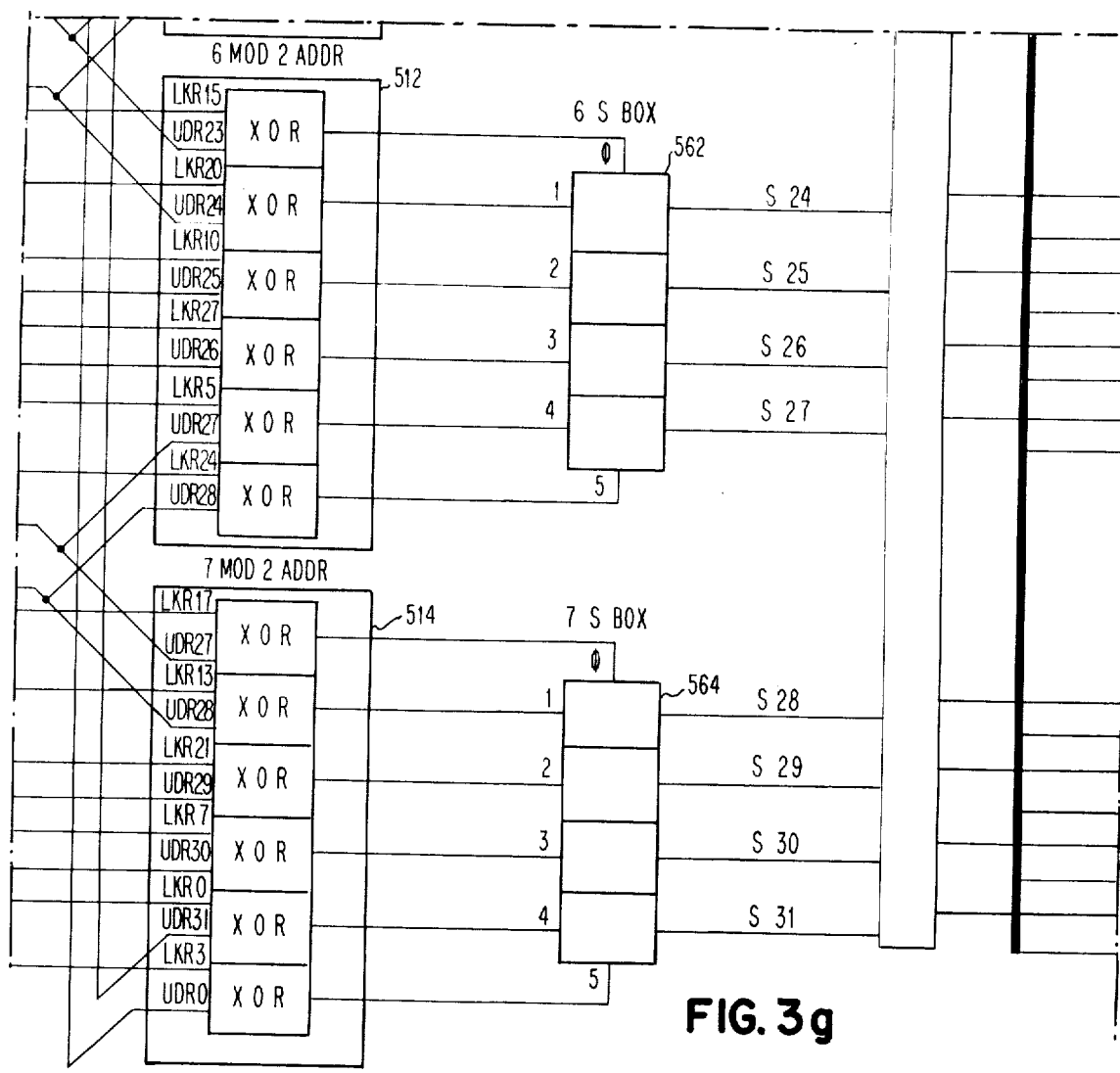

The 48 permuted cipher key bits considered as 8 6-bit segments are applied as one input of the 8 modulo-2 adders 500, 502, 504, 506, 508, 510, 512 and 514, each of which consists of six exclusive OR's. At the same time, the first half of the message block contained in UDR 200, consisting of 32 data bits considered as 8 4-bit data segments, is expanded into 48 data bits consisting of 8 6-bit data segments and applied as the other input of the 8 modulo-2 adders 500 to 514. The expansion is accomplished by duplicating the end bits of each of the 8 4-bit data segments as shown in FIGS. 3e, 3f and 3g. The 8 modulo-2 adders 500 to 514 effectively combine the expanded 48 data bits in parallel with the permuted 48 cipher key bits producing 8 6-bit segments forming the actual arguments for 8 nonaffine substitution function boxes 550 to 564 as set forth in the following Tables 8 and 9:

TABLE 8

| S BOX MAPPING SCHEDULE A | | | | |
|---|---|---|---|---|
| PERMUTED UKR BIT NO. |  | UDR BIT NO. | S BOX BIT NO. | S BOX NO. |
| UKR 13 | ⊕ | UDR 31 | 0 | 0 |
| UKR 16 | ⊕ | UDR 0 | 1 | 0 |
| UKR 10 | ⊕ | UDR 1 | 2 | 0 |
| UKR 23 | ⊕ | UDR 2 | 3 | 0 |
| UKR 0 | ⊕ | UDR 3 | 4 | 0 |
| UKR 4 | ⊕ | UDR 4 | 5 | 0 |
| UKR 2 | ⊕ | UDR 3 | 0 | 1 |
| UKR 27 | ⊕ | UDR 4 | 1 | 1 |
| UKR 14 | ⊕ | UDR 5 | 2 | 1 |
| UKR 5 | ⊕ | UDR 6 | 3 | 1 |
| UKR 20 | ⊕ | UDR 7 | 4 | 1 |
| UKR 9 | ⊕ | UDR 8 | 5 | 1 |

TABLE 8-continued

S BOX MAPPING SCHEDULE A

| PERMUTED UKR BIT NO. | | UDR BIT NO. | S BOX BIT NO. | S BOX NO. |
|---|---|---|---|---|
| UKR 22 | ⊕ | UDR 7 | 0 | 2 |
| UKR 18 | ⊕ | UDR 8 | 1 | 2 |
| UKR 11 | ⊕ | UDR 9 | 2 | 2 |
| UKR 3 | ⊕ | UDR 10 | 3 | 2 |
| UKR 25 | ⊕ | UDR 11 | 4 | 2 |
| UKR 7 | ⊕ | UDR 12 | 5 | 2 |
| UKR 15 | ⊕ | UDR 11 | 0 | 3 |
| UKR 6 | ⊕ | UDR 12 | 1 | 3 |
| UKR 26 | ⊕ | UDR 13 | 2 | 3 |
| UKR 19 | ⊕ | UDR 14 | 3 | 3 |
| UKR 12 | ⊕ | UDR 15 | 4 | 3 |
| UKR 1 | ⊕ | UDR 16 | 5 | 3 |

TABLE 9

S BOX MAPPING SCHEDULE B

| PERMUTED LKR BIT NO. | | UDR BIT NO. | S BOX BIT NO. | S BOX NO. |
|---|---|---|---|---|
| LKR 12 | ⊕ | UDR 15 | 0 | 4 |
| LKR 23 | ⊕ | UDR 16 | 1 | 4 |
| LKR 2 | ⊕ | UDR 17 | 2 | 4 |
| LKR 8 | ⊕ | UDR 18 | 3 | 4 |
| LKR 18 | ⊕ | UDR 19 | 4 | 4 |
| LKR 26 | ⊕ | UDR 20 | 5 | 4 |
| LKR 1 | ⊕ | UDR 19 | 0 | 5 |
| LKR 11 | ⊕ | UDR 20 | 1 | 5 |
| LKR 22 | ⊕ | UDR 21 | 2 | 5 |
| LKR 16 | ⊕ | UDR 22 | 3 | 5 |
| LKR 4 | ⊕ | UDR 23 | 4 | 5 |
| LKR 19 | ⊕ | UDR 24 | 5 | 5 |
| LKR 15 | ⊕ | UDR 23 | 0 | 6 |
| LKR 20 | ⊕ | UDR 24 | 1 | 6 |
| LKR 10 | ⊕ | UDR 25 | 2 | 6 |
| LKR 27 | ⊕ | UDR 26 | 3 | 6 |
| LKR 5 | ⊕ | UDR 27 | 4 | 6 |
| LKR 24 | ⊕ | UDR 28 | 5 | 6 |
| LKR 17 | ⊕ | UDR 27 | 0 | 7 |
| LKR 13 | ⊕ | UDR 28 | 1 | 7 |
| LKR 21 | ⊕ | UDR 29 | 2 | 7 |
| LKR 7 | ⊕ | UDR 30 | 3 | 7 |
| LKR 0 | ⊕ | UDR 31 | 4 | 7 |
| LKR 3 | ⊕ | UDR 0 | 5 | 7 |

Figure 6:
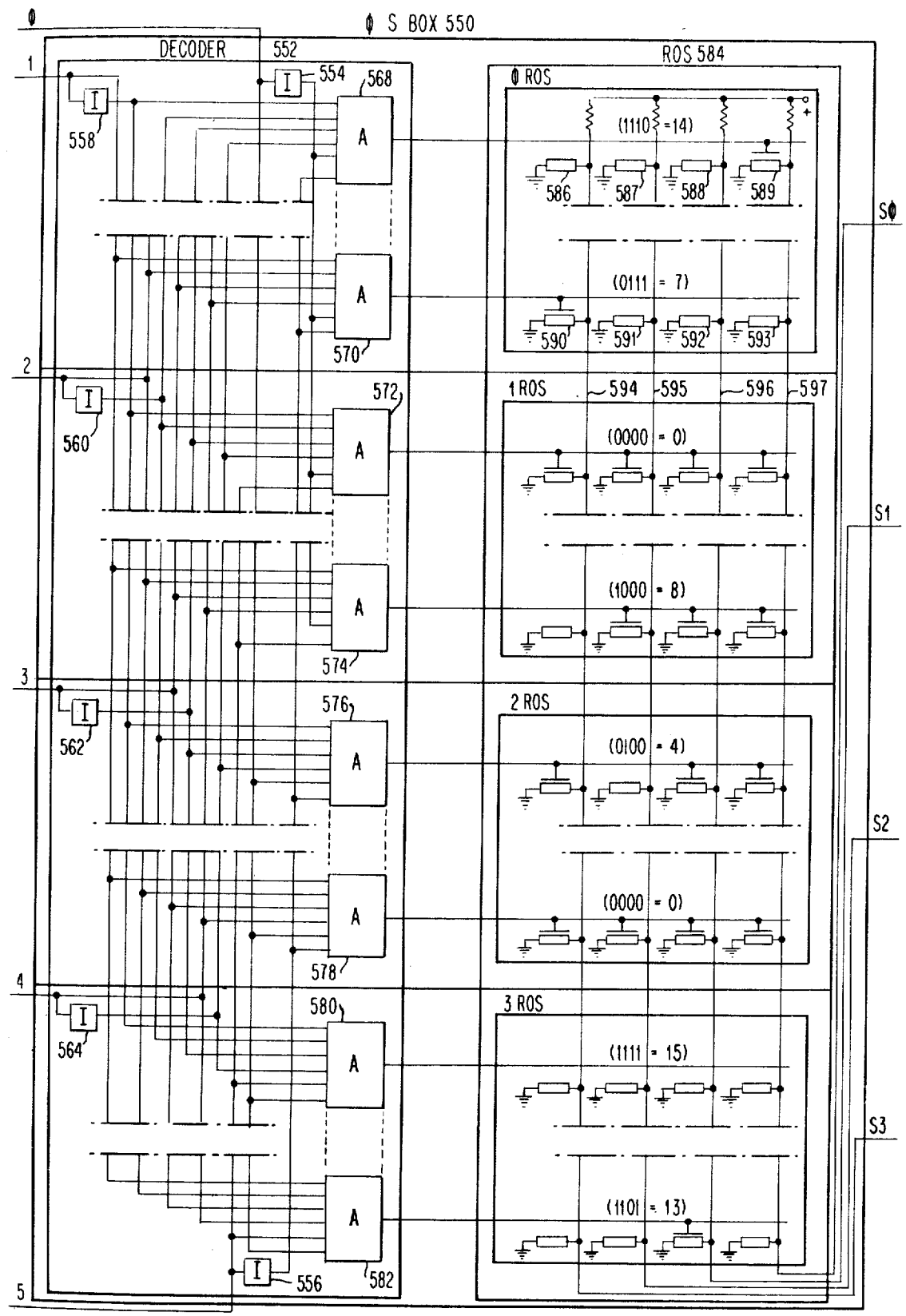
FIG. 6 illustrates the details of a substitution box used in the present invention.

Referring now to FIG. 6, representative $\phi$ S-Box 550 is shown consisting of decoder 552 and read only storage (ROS) 584. A 6-bit segment from the $\phi$ modulo-2 adder 500 is applied as the input to the $\phi$ S-Box 550. Signals representing the end bits of the applied 6-bit segment, resulting from the modulo-2 addition of duplicated data bit UDR 31 and the permuted cipher key bit UKR 13 and the modulo-2 addition of the duplicated data bit UDR 4 and the permuted cipher key bit UKR 4 are applied to inverters 554 and 556 to thereby provide true and complement signals representing the end bits of the applied 6-bit segment. When the result of the end bit modulo-2 addition is $\phi\phi$, one of four groups of 16 AND circuits are selected, namely, AND circuits 568 to 570. Likewise, when the result of the end bit modulo-2 addition is $\phi 1$, the second of the 4 groups of 16 AND circuits are selected, namely, AND circuits 572 to 574. Similarly, when the result of the end bit modulo-2 addition is $1\phi$, the third of four groups of 16 AND circuits are selected, namely, AND circuits 576 and 578. Lastly, when the result of the end bit modulo-2 addition is 11, the fourth of the four groups of 16 AND circuits are selected, namely, AND circuits 580 to 582. Signals representing the inner 4 bits of the applied 6-bit segment are applied to inverters 558, 560, 562 and 564 to thereby provide true and complement signals representing the inner 4 bits of the applied 6-bit segment. The inner 4 bits of the 6-bit segment are decoded by one of the 16 AND circuits of the selected group to apply a driving signal to an address line of the ROS 584. ROS 584 essentially consists of 4 function tables, $\phi$ROS, 1ROS, 2ROS and 3ROS, each containing 16 entries and each entry consisting of 4 bits in the form of 4 FET devices such as devices 586, 587, 588 and 589, or devices 590, 591, 592 and 593. The devices, when selected, produce a unique 4-bit segment on the output lines 594, 595, 596 and 597 of ROS 584 which are applied to the 4 output lines S$\phi$, S1, S2 and S3 of the S-Box 550. While the arrangement of the other 7 of the 8 S-Boxes are similar to that of $\phi$ S-Box 550, the function tables in each of the other S-Boxes are different from each other, thereby providing 8 different transformation functions. The outputs of the function tables of the 8 S-Boxes are shown in the following Tables 10, 11, 12 and 13 of S-Box functions where each output number represents a 4-bit (Hexadecimal) binary pattern, i.e., 14 = 1 1 1 0:

TABLE 10

S-BOX FUNCTION TABLE A

| | 0 S-BOX S BOX END BITS | | | | 1 S-BOX S BOX END BITS | | | |
|---|---|---|---|---|---|---|---|---|
| S BOX INNER BITS | 00 (0) | 01 (1) | 10 (2) | 11 (3) | 00 (0) | 01 (1) | 10 (2) | 11 (3) |
| 0000 (0) | 14 | 0 | 4 | 15 | 15 | 3 | 0 | 13 |
| 0001 (1) | 4 | 15 | 1 | 12 | 1 | 13 | 14 | 8 |
| 0010 (2) | 13 | 7 | 14 | 8 | 8 | 4 | 7 | 10 |
| 0011 (3) | 1 | 4 | 8 | 2 | 14 | 7 | 11 | 1 |
| 0100 (4) | 2 | 14 | 13 | 4 | 6 | 15 | 10 | 3 |
| 0101 (5) | 15 | 2 | 6 | 9 | 11 | 2 | 4 | 15 |
| 0110 (6) | 11 | 13 | 2 | 1 | 3 | 8 | 13 | 4 |
| 0111 (7) | 8 | 1 | 11 | 7 | 4 | 14 | 1 | 2 |
| 1000 (8) | 3 | 10 | 15 | 5 | 9 | 12 | 5 | 11 |
| 1001 (9) | 10 | 6 | 12 | 11 | 7 | 0 | 8 | 6 |
| 1010 (10) | 6 | 12 | 9 | 3 | 2 | 1 | 12 | 7 |
| 1011 (11) | 12 | 11 | 7 | 14 | 13 | 10 | 6 | 12 |
| 1100 (12) | 5 | 9 | 3 | 10 | 12 | 6 | 9 | 0 |
| 1101 (13) | 9 | 5 | 10 | 0 | 0 | 9 | 3 | 5 |
| 1110 (14) | 0 | 3 | 5 | 6 | 5 | 11 | 2 | 14 |
| 1111 (15) | 7 | 8 | 0 | 13 | 10 | 5 | 15 | 9 |

TABLE 11

S-BOX FUNCTION TABLE B

| S BOX INNER BITS | 2 S-BOX S BOX END BITS | | | | 3 S-BOX S BOX END BITS | | | |
|---|---|---|---|---|---|---|---|---|
| | 00 (0) | 01 (1) | 10 (2) | 11 (3) | 00 (0) | 01 (1) | 10 (2) | 11 (3) |
| 0000 (0) | 10 | 13 | 13 | 1 | 7 | 13 | 10 | 3 |
| 0001 (1) | 0 | 7 | 6 | 10 | 13 | 8 | 6 | 15 |
| 0010 (2) | 9 | 0 | 4 | 13 | 14 | 11 | 9 | 0 |
| 0011 (3) | 14 | 9 | 9 | 0 | 3 | 5 | 0 | 6 |
| 0100 (4) | 6 | 3 | 8 | 6 | 0 | 6 | 12 | 10 |
| 0101 (5) | 3 | 4 | 15 | 9 | 6 | 15 | 11 | 1 |
| 0110 (6) | 15 | 6 | 3 | 8 | 9 | 0 | 7 | 13 |
| 0111 (7) | 5 | 10 | 0 | 7 | 10 | 3 | 13 | 8 |
| 1000 (8) | 1 | 2 | 11 | 4 | 1 | 4 | 15 | 9 |
| 1001 (9) | 13 | 8 | 1 | 15 | 2 | 7 | 1 | 4 |
| 1010 (10) | 12 | 5 | 2 | 14 | 8 | 2 | 3 | 5 |
| 1011 (11) | 7 | 14 | 12 | 3 | 5 | 12 | 14 | 11 |
| 1100 (12) | 11 | 12 | 5 | 11 | 11 | 1 | 5 | 12 |
| 1101 (13) | 4 | 11 | 10 | 5 | 12 | 10 | 2 | 7 |
| 1110 (14) | 2 | 15 | 14 | 2 | 4 | 14 | 8 | 2 |
| 1111 (15) | 8 | 1 | 7 | 12 | 15 | 9 | 4 | 14 |

TABLE 12

S-BOX FUNCTION TABLE C

| S BOX INNER BITS | 4 S-BOX S BOX END BITS | | | | 5 S-BOX S BOX END BITS | | | |
|---|---|---|---|---|---|---|---|---|
| | 00 (0) | 01 (1) | 10 (2) | 11 (3) | 00 (0) | 01 (1) | 10 (2) | 11 (3) |
| 0000 (0) | 2 | 14 | 4 | 11 | 12 | 10 | 9 | 4 |
| 0001 (1) | 12 | 11 | 2 | 8 | 1 | 15 | 14 | 3 |
| 0010 (2) | 4 | 2 | 1 | 12 | 10 | 4 | 15 | 2 |
| 0011 (3) | 1 | 12 | 11 | 7 | 15 | 2 | 5 | 12 |
| 0100 (4) | 7 | 4 | 10 | 1 | 9 | 7 | 2 | 9 |
| 0101 (5) | 10 | 7 | 13 | 14 | 2 | 12 | 8 | 5 |
| 0110 (6) | 11 | 13 | 7 | 2 | 6 | 9 | 12 | 15 |
| 0111 (7) | 6 | 1 | 8 | 13 | 8 | 5 | 3 | 10 |
| 1000 (8) | 8 | 5 | 15 | 6 | 0 | 6 | 7 | 11 |
| 1001 (9) | 5 | 0 | 9 | 15 | 13 | 1 | 0 | 14 |
| 1010 (10) | 3 | 15 | 12 | 0 | 3 | 13 | 4 | 1 |
| 1011 (11) | 15 | 10 | 5 | 9 | 4 | 14 | 10 | 7 |
| 1100 (12) | 13 | 3 | 6 | 10 | 14 | 0 | 1 | 6 |
| 1101 (13) | 0 | 9 | 3 | 4 | 7 | 11 | 13 | 0 |
| 1110 (14) | 14 | 8 | 0 | 5 | 5 | 3 | 11 | 8 |
| 1111 (15) | 9 | 6 | 14 | 3 | 11 | 8 | 6 | 13 |

TABLE 13

S-BOX FUNCTION TABLE D

| S BOX INNER BITS | 6 S-BOX S BOX END BITS | | | | 7 S-BOX S BOX END BITS | | | |
|---|---|---|---|---|---|---|---|---|
| | 00 (0) | 01 (1) | 10 (2) | 11 (3) | 00 (0) | 01 (1) | 10 (2) | 11 (3) |
| 0000 (0) | 4 | 13 | 1 | 6 | 13 | 1 | 7 | 2 |
| 0001 (1) | 11 | 0 | 4 | 11 | 2 | 15 | 11 | 1 |
| 0010 (2) | 2 | 11 | 11 | 13 | 8 | 13 | 4 | 14 |
| 0011 (3) | 14 | 7 | 13 | 8 | 4 | 8 | 1 | 7 |
| 0100 (4) | 15 | 4 | 12 | 1 | 6 | 10 | 9 | 4 |
| 0101 (5) | 0 | 9 | 3 | 4 | 15 | 3 | 12 | 10 |
| 0110 (6) | 8 | 1 | 7 | 10 | 11 | 7 | 14 | 8 |
| 0111 (7) | 13 | 10 | 14 | 7 | 1 | 4 | 2 | 13 |
| 1000 (8) | 3 | 14 | 10 | 9 | 10 | 12 | 0 | 15 |
| 1001 (9) | 12 | 3 | 15 | 5 | 9 | 5 | 6 | 12 |
| 1010 (10) | 9 | 5 | 6 | 0 | 3 | 6 | 10 | 9 |
| 1011 (11) | 7 | 12 | 8 | 15 | 14 | 11 | 13 | 0 |
| 1100 (12) | 5 | 2 | 0 | 14 | 5 | 0 | 15 | 3 |
| 1101 (13) | 10 | 15 | 5 | 2 | 0 | 14 | 3 | 5 |
| 1110 (14) | 6 | 8 | 9 | 3 | 12 | 9 | 5 | 6 |
| 1111 (15) | 1 | 6 | 2 | 12 | 7 | 2 | 8 | 11 |

Referring now to FIGS. 3e, 3f and 3g, the 8 S-Boxes 550 to 564 produce 8 4-bit segments defining a substitution set of 32 bits which are linearly transformed by an arbitrary but fixed permutation in P box 600. The combined nonlinear transformation performed by the S-Boxes 550 to 564 and the linear transformation performed by the P Box 600 results in a product block cipher of the first half of the message block. The linear permutation of the S-Box outputs is shown in the following Table 14:

TABLE 14

S-BOX OUTPUT PERMUTATION MAP

| S BOX BIT NO. | PERMUTED S BOX BIT NO. |
|---|---|
| S0 | S8 |
| S1 | S16 |
| S2 | S22 |
| S3 | S30 |

TABLE 14-continued

| S BOX BIT NO. | S-BOX OUTPUT PERMUTATION MAP PERMUTED S BOX BIT NO. |
|---|---|
| S4 | S12 |
| S5 | S27 |
| S6 | S1 |
| S7 | S17 |
| S8 | S23 |
| S9 | S15 |
| S10 | S29 |
| S11 | S5 |
| S12 | S25 |
| S13 | S19 |
| S14 | S9 |
| S15 | S0 |
| S16 | S7 |
| S17 | S13 |
| S18 | S24 |
| S19 | S2 |
| S20 | S3 |
| S21 | S28 |
| S22 | S10 |
| S23 | S18 |
| S24 | S31 |
| S25 | S11 |
| S26 | S21 |
| S27 | S6 |
| S28 | S4 |
| S29 | S26 |
| S30 | S14 |
| S31 | S20 |

Figure 3H:
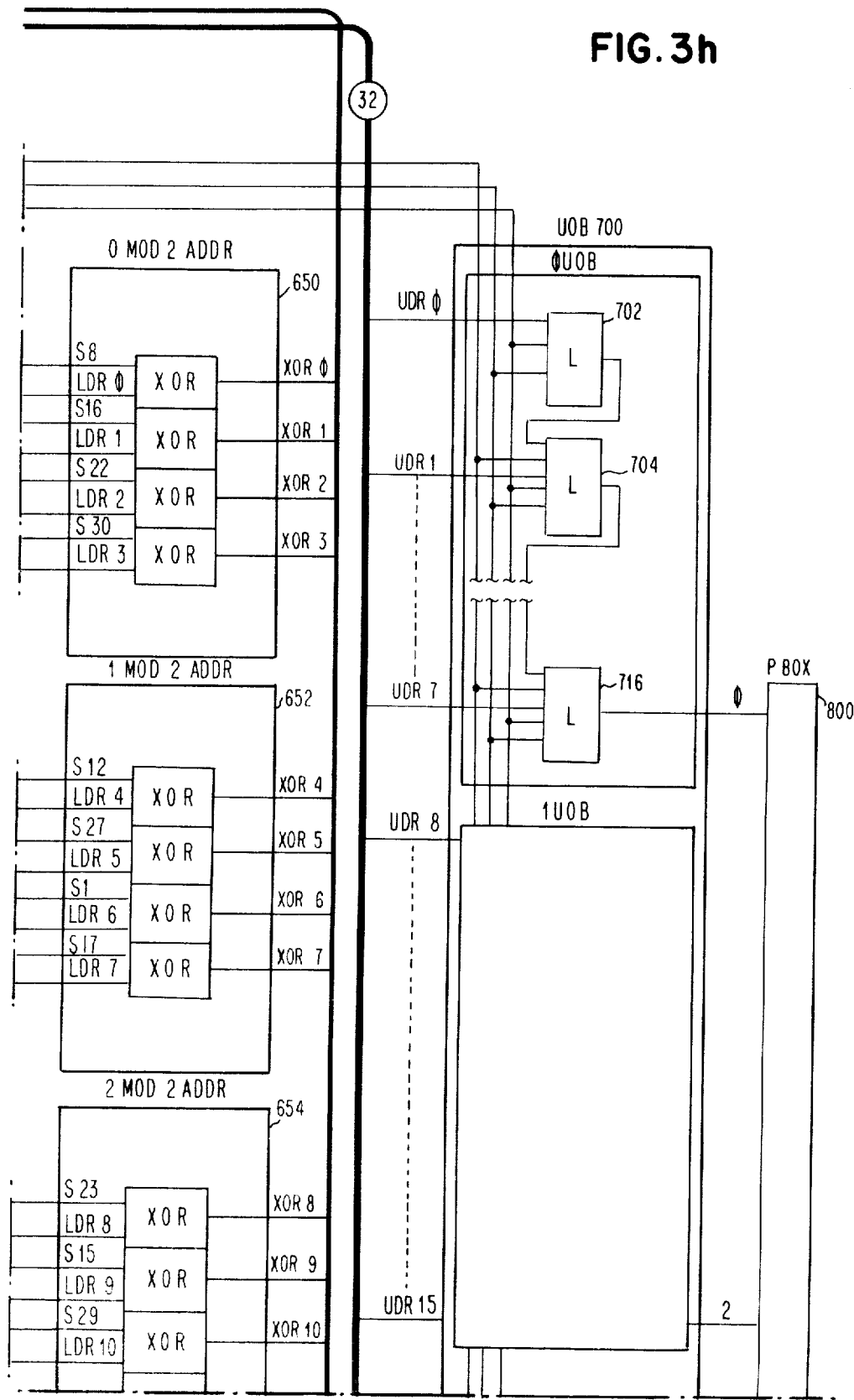
Figure 3I:
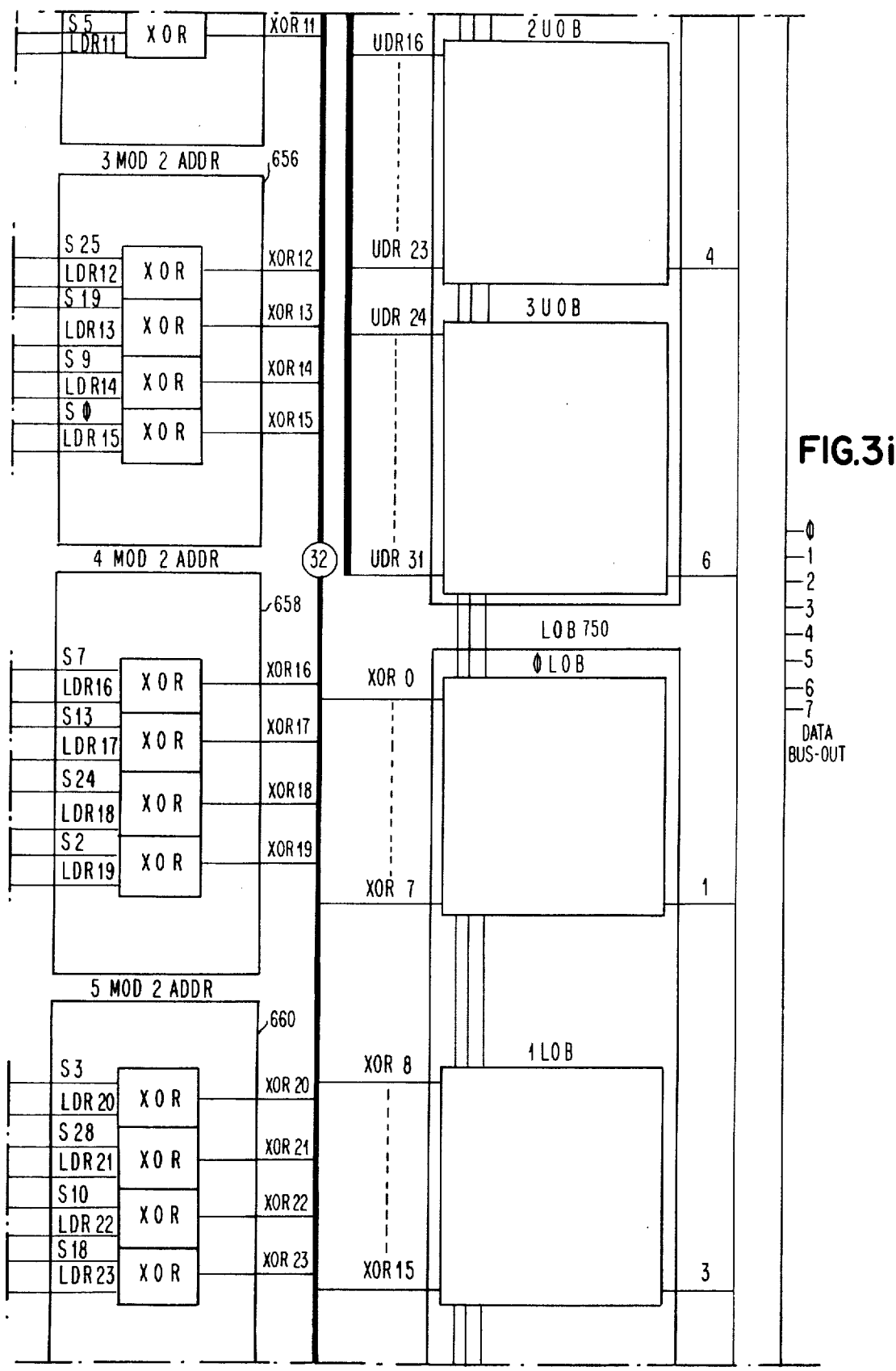

Referring now to FIGS. 3h, 3i and 3j, the 8 modulo-2 adders 650, 652, 654, 656, 658, 660, 662 and 664, each consists of 4 exclusive OR's. The second half of the message block contained in LDR 250 consisting of 32 data bits considered as 8 4-bit data segments, together with the permuted substitution set of 32 bits representing the product block cipher of the first half of the message block, are applied as inputs to the 8 modulo-2 adders 650 to 664. The 8 modulo-2 adders 650 to 664 effectively modify the 32 data bits of the second half of the message block in parallel with the 32-bit product block cipher of the first half of the message block producing 8 4-bit segments forming a new set of 32 bits representing the modified second half of the message block which is applied via a bus to the UDR 200 in FIG. 3a.

Referring now to FIG. 3a and the timing diagram in FIG. 7a, during the first part of cycle 10, first signals are applied to the LB and $\overline{\text{LDR}}$ lines which are connected to all of the latches in the UDR 200 permitting the new set of 32 bits representing the modified second half of the message block to be stored in the UDR 200. At the same time, the signals on the LB and $\overline{\text{LDR}}$ lines are also supplied to all of the latches of the LDR 250 permitting the first half of the message block presently stored in the UDR 200 to be transferred to and stored in the latches of the LDR 250. This transposing of the now modified second half of the message block and the first half of the message block is in preparation for carrying out the next iteration operation of the enciphering process. At this point, the first iteration operation of the enciphering process that was started after the pershift of the cipher key in cycle 8 is completed.

Referring now to FIGS. 3a to 3j and the timing diagram of FIG. 7a, the second iteration operation of the enciphering process is carried out during cycles 10, 11 and 12 and is initiated by a shifting operation performed during cycle 10. During cycle 10, second signals on the SL and $\overline{\text{LDK}}$ lines applied to all stages of UKR 350 and LKR 400 cause another 1 bit position shift up of the cipher key in accordance with the cipher key shift schedule. This provides a second set of cipher key bits for the second iteration operation of the enciphering process. During cycle 11, the modified second half of the message block presently stored in UDR 200 is then used in a similar product block cipher operation, as described above, the result of which is used by the modulo-2 adders 650 to 664 to modify the first half of the message block presently stored in LDR 250.

Referring now to FIG. 3a and the timing diagram in FIG. 7a, during cycle 12, second signals are applied to the LB and $\overline{\text{LDR}}$ lines which being connected to all the latches in UDR 200 permit the next new set of 32 bits representing the modified first half of the message block to be stored in UDR 200. At the same time, the second signals on the LB and $\overline{\text{LDR}}$ lines are also applied to all latches of LDR 250 permitting the modified second half of the message block presently stored in UDR 200 to be transferred to and stored in LDR 250. This operation prepares the cipher device to carry out the next iteration of the enciphering process. At this point, the second iteration operation of the enciphering operation is completed.

Referring now to the cipher key shift schedule in Table 5, it should be noted that the cipher key must be shifted 2 bit positions during the third iteration operation of the enciphering process which is carried out during cycles 11, 12, 13 and 14. Accordingly, during cycle 11, the first of the two shift operations of the cipher key is performed by applying third signals to the SL and $\overline{\text{LDK}}$ lines. This initiates the first of the two shifts for the third iteration operation and because of the resolving time through the cipher device has no effect on the second iteration operation which was initiated by the second signal applied to the SL line. During cycle 12, fourth signals applied to the SL and $\overline{\text{LDK}}$ lines cause the cipher key to be shifted up another 1 bit position. Thus, the cipher key is shifted 2 bit positions by the third and fourth signals applied to the SL and $\overline{\text{LDK}}$ lines during the third iteration operation.

In a similar manner, and in accordance with the cipher key shift schedule, successive iteration operations of the enciphering process are carried out by the cipher device. During each of the remaining iteration operations of the enciphering process except the last, the cipher key bits in UKR 350 and LKR 400 are shifted according to the predetermined shift schedule, a modified half of the message block stored in LDR 250 is remodified according to a product block cipher of the previously modified half of the message block stored in UDR 200 and the resulting remodified half of a message block from the modulo-2 adders 650 to 664 is applied to replace the previously modified half of the message block contained in UDR 200 which at the same time is transferred to replace the contents of LDR 250. During the last iteration operation of the enciphering process, performed during cycles 28 and 39, the cipher key bits in UKR 350 and LKR 400 are shifted a last time according to the shift schedule and a last remodification of a modified half of the message block stored in LDR 250 is performed according to a product block cipher of the previously modified half of the message block stored in UDR 200 but the resulting remodified half of the messge block from the modulo-2 adders 650 to 664 and the previously modified half of the message block stored in UDR 200 are not transposed due to the absence of a signal on the LB line and now constitute the enciphered version of the original message block. Consequently, referring to FIGS. 3a, 3h, 3i and 3j, the 32-bit output of the UDR 200 and the 32-bit output of the modulo-2 adders 650 to 664, representing the 64-bit enciphered version of the original message block, are applied to the UOB 700 and the LOB 750, respectively. The UOB 700 and LOB 750 each consists of 4 8-stage shift registers φUOB, 1UOB, 2UOB, 3UOB and φLOB, 1LOB, 2LOB, 3LOB. The first, second and last stages of the first shift register φUOB are shown in detail in FIG. 3h with the remaining shift registers being shown in block form inasmuch as they are identical in detail to that of the shift register φUOB.

Referring now to FIGS. 3h, 3i and 3j and the timing diagram of FIG. 7b, during cycle 40, signals are applied to the LDOB and $\overline{\text{LDOB}}$ lines which are connected to all of the latches in each of the shift registers of the UOB 700 and LOB 750 such as latches 702, 704 and 716 in shift register UOB. Accordingly, these signals are effective to cause a parallel transfer of the 32-bit output of the UDR 200 to the UOB 700 and a concurrent parallel transfer of the 32-bit output of the modulo-2 adders 650 to 664 of the LOB 750.

The 64-bit enciphered block of data now stored in UOB 700 and LOB 750 is subjected to a parallel to serial conversion, an 8-bit byte at a time, with the bit content of the last stage of each of the 8 registers being applied as an 8-bit byte to the P box 800 where each 8-bit byte is subjected to a final linear permutation to connect the enciphered data bits to the proper bit lines of the data bus-out. This is accomplished by the application of signals on the DOB and $\overline{\text{LDOB}}$ lines to the second to the eighth stages of each of the 8 shift registers 0UOB, 1UOB, 2UOB 3UOB and 0LOB, 1LOB, 2LOB,, 3LOB. Thus, during each of the cycles 41 to 47 the data bits in each of the 8 shift registers are shifted down by one position and an 8-bit byte of data is permuted via the P box 800 to the data bus-out. At the end of cycle 48, the last byte of the 64-bit enciphered block of data is transmitted and the enciphering process is completed.

While it is not shown in the timing diagram of FIGS. 7a and 7b, it should be apparent that successive message blocks of data may be enciphered in a similar manner. Accordingly, during the enciphering of the first message block of data, if the next message block of data is received by the cipher device, it may be loaded into the UIB 100 and LIB 150. Then, at the end of cycle 39, when the last iteration of the first enciphering process is completed, the ciphering key has made a complete revolution through the UKR 350 and LKR 400 and is back to its original format in preparation for controlling the enciphering of the next message block of data. Therefore, during cycle 40 of the first enciphering opepration, while the enciphered first message block of data is being transferred to UOB 700 and LOB 750, the next message block of data may be transferred to UDR 200 and LDR 250 under control of signals applied to the IBT and $\overline{\text{LDR}}$ lines, shown in dotted form in FIG. 7b, and the next enciphering process may proceed while the first message block of data is being transferred from UOB 700 and LOB 750 via P box 800 to the data bus-out. It should be apparent that if the rate of message block transmission to the cipher device becomes too high, so that a succeeding message block of data is received before the preceding message block of data has been transferred from the input buffers to the data registers, then circuitry will have to be provided to indicate this condition, e.g., a busy signal. This will permit succeeding blocks of data to be transmitted synchronously at the operating speed of the cipher device.

DECIPHERING PROCESS

Deciphering a 64-bit enciphered message block of data is accomplished under control of the same cipher key as is used in the enciphering process through the same series of 16 iterations. However, the deciphering process, the cipher key is postshifted after the last iteration operation rather than preshifted before the first iteration operation as in the case of the enciphering process. Additionally, the cipher key is shifted in a direction opposite to that of the enciphering process according to the predetermined shift schedule shown in Table 5. This assures proper alignment of the cipher key bits during the deciphering iterations to undo every iteration that was carried out in the enciphering process and produce a resulting 64-bit message block identical with the original message block.

Referring now to FIGS. 3a to 3d and the timing diagram in FIG. 7a, during cycles 0 to 7 the enciphered message block of data is received via the data bus-in, buffered in UIB 100 and LIB 150 and the cipher key is received and loaded into UKR 350 and LKR 400, in a manner as previously described. During cycle 8, the enciphered message block is transferred in parallel from the UIB 100 and LIB 150 to the UDR 200 and LDR 250, respectively, as previously described. Referring now to FIGS. 3a to 3j, during cycle 9, a first half of the enciphered message block presently stored in UDR 200 is used with a permuted set of the cipher key bits in a product block cipher operation, the result of which is used by the modulo-2 adders 650 to 664 to modify the second half of the message block presently stored in LDR 250 in a similar manner to that described in the enciphering process. Referring now to FIG. 7a, during cycle 10, the first signal applied to the LB line and the signal applied to the LDR line permit the modified second half of the enciphered message block to replace the first half of the enciphered message block in UDR 200 which at the same time replaces the second half of the enciphered message in LDR 250 in preparation for the next iteration operation of the deciphering process.

The second iteration operation of the deciphering process is carried out during cycles 10, 11 and 12 and is initiated by shifting the cipher key bits down one bit position during cycle 10. This is accomplished by the first signal on the SRR line applied to the first stages of the UKR 350 and LKR 400, the first signal on the SR line applied to the remaining stages of each of the UKR 350 and LKR 400 and the signal on the $\overline{\text{LDK}}$ line applied to all stages of the UKR 350 and the LKR 400. The first signal on the SRR line together with the signal on the $\overline{\text{LDK}}$ line causes the bit content of the last stage of each of the UKR 350 and LKR 400 to be transferred up to the first stage of each of these registers while the first signal on the SR line together with the signal on the $\overline{\text{LDK}}$ line, which are applied to all of the remaining stages of the UKR 350 and LKR 400, causes the bit content of each stage of these registers to be transferred down to the succeeding stage thereby providing a 1 bit position shift down of the entire cipher key. This provides a new set of cipher key bits for the second iteration of the deciphering process which is completed by the end of cycle 12 in a similar manner to that described for the enciphering process.

Referring now to the cipher key shift schedule in Table 5, it should be noted that the cipher key must be shifted 2 bit positions at the beginning of the third iteration of the deciphering process. Accordingly, during cycle 11, the first of the two shift operations of the cipher key is performed by applying second signals ot the SRR and SR lines and a signal to the $\overline{\text{LDK}}$ line. During cycle 12 third signal are applied to the SRR and SR lines and another signal to the $\overline{\text{LDK}}$ line causing the cipher key to be shifted down 2 bit positions by the second and third signals applied to the SRR and SR lines. In a similar manner, and in accordance with the cipher key shift schedule, successive iteration operations of the deciphering process are carried out by the cipher device which are completed by the end of cycle 30, except that in the 16th iteration the absence of a signal on the LB line inhibits the transposing operation similar to that described in the 16th iteration of the enciphering operation. During cycle 40, a postshift operation of the cipher key is performed to complete a full revolution of the cipher key through the UKR 350 and LKR 400 back to its original format in preparation for controlling the deciphering of the next message block of data. Then, during cycles 40 to 48 the deciphered message block of data is parallel transferred from the output of the UDR 200 and the modulo-2 adders 650 to 664 to the UOB 700 and LOB 750, respectively, and then transferred, an 8-bit byte at a time, via the P box 800 to the data bus-out. At the end of the cycle 48, the last byte of the 64-bit deciphered block of data is transmitted and the deciphering process is completed. While it is not shown in the timing diagrams of FIGS. 7a and 7b, it should be apparent that successive enciphered message blocks of data may be deciphered in a similar manner. It should also be apparent by those skilled in the art that the modulo-2 addition performed by the modulo-2 adders 650 and 664 during enciphering is a self-reversing process which occurs during the deciphering process.

While the invention has shown a series of modulo-2 adders 500 to 514, it should be apparent by those skilled in the art that the product block cipher operation need not be restricted to the use of such modulo-2 addders only, but that any type adder or combination of adders may be used provided a 48-bit output is produced.

While the invention has been described in terms of an encipher device for enciphering a message block of clear data and a decipher device for deciphering the enciphered message block of data back to the original block of clear data, it should be recognized by those skilled in the art that the encipher/decipher devices are inverse devices and, therefore, are not limited to that type of operation. For example, a decipher device may be used to encipher a message block of clear data and an encipher device may then be used to decipher the enciphered message block of data back to the original block of clear data.

While the invention has been particularly shown and described with reference to the preferred embodiment hereof, it will be understood by those skilled in the art that several changes in form and detail may be made without departing from the spirit and scope of the invention.

What is claimed is:

1. A device for ciphering a message block of data bits under control of a set of cipher key bits by a predetermined number of iteration operations, said cipher device comprising:

first store means storing a first half of said message block of data bits, second store means storing a second half of said message block of data bits, control means including third store means storing said set of cipher key bits, and first linear transformation means connected to said third store means producing a permuted set of cipher key bits from said set of cipher key bits, expansion means connected to said first store means duplicating predetermined ones of the data bits of the first half of said message block to produce an expanded first half of said message block containing data bits equal in number to the number of cipher key bits in said permuted set of cipher key bits, means connected to said expansion means and said control means carrying out a substitution transformation function in accordance with the data bits of said expanded first half of said message block and the cipher key bits of said permuted set of cipher key bits to produce a substitution set of bits equal in number to the number of bits in the first half of said message block, second linear transformation means connected to said substitution transformation means producing a permuted substitution set of bits, the combined transformation performed by said substitution transformation means and said second linear transformation means resulting in a product block cipher of the first half of said message block, means connected to said second store means and said second linear transformation means modifying the data bits of the second half of said message block in accordance with the product block cipher of the first half of said message block to produce a set of bits representing a modified second half of said message block, means connected between said modifying means and said first store means to load said modified second half of said message block from said modifying means into said first store means, and means connected between said first store means and said second store means to load the first half of said message block from said first store means into said second store means concurrently with said modified second half of said message block being loaded into said first store means to complete a first iteration operation of said cipher device.

2. A cipher device as defined in claim 1 wherein a second iteration operation of said cipher device is performed and further comprising:

means effective during said second iteration operation to shift said set of cipher key bits in said control means in a predetermined direction according to a predetermined shift schedule to produce a new permuted set of cipher key bits, said cipher device being further effective during said second iteration operation to modify the first half of said message block of data stored in said second store means in accordance with said modified second half of said message block of data stored in said first store means and said new permuted set of cipher key bits produced by said control means to produce a modified first half of said message block of data in a similar manner in which the second half of said message block was modified during said first iteration operation and concurrently load said modified first half of said message block from said modifying means into said first store means and said modified second half of said message block from said first store means into said second store means to complete said second iteration operation of said cipher device.

3. A cipher device as defined in claim 2 wherein the remaining iteration operations of said predetermined number of iteration operations are each performed in a similar manner as is performed in said second iteration operation to repetitively shift each set of cipher key bits in said control means in said predetermined direction according to said predetermined shift schedule to produce another new permuted set of cipher key bits in each remaining iteration operation, remodify each modified half of said message block of data stored in said second store means in accordance with each previously modified half of said message block of data stored in said first store means and each other new permuted set of cipher key bits produced by said control means to produce a remodified half of said message block of data stored in said second store means in each remaining iteration operation, and concurrently load each presently remodified half of said message block of data from said modifying means into said first store means and each previously modified half of said message block of data from said first store means into said second store means in each remaining iteration operation except the last, and further comprising:

first output means, second output means, means connected between said first store means and said first output means effective after the last iteration operation to transfer the previously modified half of said message block from said first store means to said first output means, and means connected between said modifying means and said second output means effective after the last iteration operation to transfer the presently remodified half of said message block from said modifying means to said second output means, whereby said first and second output means contains a cipher of said message block of data bits.

4. A device for enciphering message blocks of data bits under control of a set of cipher key bits by a predetermined number of iteration operations, said cipher device comprising:

first store means storing a first half of message block of data bits, second store means storing a second half of a message block of data bits, control means including third store means storing said set of cipher key bits, and first linear transformation means connected to said third store means producing a permuted set of cipher key bits from said set of cipher key bits, means shifting said set of cipher key bits in said control means in a predetermined direction according to a predetermined shift schedule to produce a preshifted permuted set of cipher key bits, expansion means connected to said first store means duplicating predetermined ones of the data bits of the first half of said message block to produce an expanded first half of said message block containing data bits equal in number to the number of cipher key bits in said preshifted permuted set of cipher key bits, means connected to said expansion means and said control means carrying out a substitution transformation function in accordance with the data bits of said expanded first half of said message block and the cipher ket bits of said preshifted permuted set of cipher key bits to produce a substitution set of bits equal in number to the number of bits in the first half of said message block, l second linear transformation means connected to said substitution transformation means producing a permuted substitution set of bits, means connected to said second store means and said second linear transformation means modifying the data bits of the second half of said message block in accordance with said permuted substitution set of bits to produce a set of data bits representing a modified second half of said message block, means connected between said modifying means and said first store means to load said modified second half of said message block of data from said modifying means into said first store means, and means connected between said first store means and said second store means to load the first half of said message block of data from said first store means into said second store means concurrently with said modified second half of said message block of data being loaded into said first store means to complete a first iteration operation of said encipher device, whereby said encipher device is effective during a second iteration operation to shift the set of cipher key bits in said control means in said predetermined direction according to said predetermined shift schedule to produce a new permuted set of cipher key bits, modify the first half of said message block of data stored in said second store means in accordance with the modified second half of said message block of data stored in said first store means and said new permuted set of cipher key bits to produce a modified first half of said message block of data and concurrently load the modified first half of said message block of data from said modifying means into said first store means and the modified second half of said message block of data from said first store means into said second store means.

5. An encipher device as defined in claim 4 wherein the remaining iteration operations of said predetermined number of iteration operations are each performed in a similar manner as is performed in said second iteration operation to repetitively shift each set of cipher key bits in said control means in said predetermined direction according to said predetermined shift schedule to produce another new permuted set of cipher key bits in each remaining iteration operation, remodify each modified half of said message block of data stored in said second store means in accordance with each previously modified half of said message block of data stored in said first store means and each other new permuted set of cipher key bits to produce a remodified half of said message block of data, stored in said second store means in each remaining iteration operation, and concurrently load each presently remodified half of said message block of data from said modifying means to said first store means and each previously modified half of said message block of data from said first store means to said second store means in each remaining iteration operation except the last, and further comprising:

first output means, second output means, means connected between said first store means and said first output means effective after the last iteration operation to transfer the previously remodified half of said message block from said first store means to said first output means, and means connected between said modifying means and said second output means effective after the last iteration operation to transfer the presently remodified half of said message block from said modifying means to said second output means, whereby said first and second output means contains an encipher of said message block of data bits.

6. A device for enciphering 64-bit message blocks of data under control of a set of cipher key bits by a predetermined number of iteration operations, said encipher device comprising:

first store means storing a 32-bit first half of a message block of data, second store means storing a 32-bit second half of a message block of data, control means including third store means storing said set of cipher key bits, and first linear transformation means connected to said third store means producing a 48-bit permuted set of cipher key bits from said set of cipher key bits, means shifting said set of cipher key bits in said control means in a predetermined direction according to a predetermined shift schedule to produce a preshifted 48-bit permuted set of cipher key bits, expansion means connected to said first store means duplicating 16 predetermined ones of the data bits of the 32-bit first half of said message block to produce an expanded 48-bit first half of said message block, means connected to said expansion means and said control means carrying out a substitution transformation function in accordance with the 48 data bits of said expanded first half of said message block and the 48 cipher key bits of said preshifted permuted set of cipher key bits to produce a substitution set of 32 bits, second linear transformation means connected to said substitution transformation means producing a permuted substitution set of 32 bits, means connected to said second store means and said second linear transformation means modifying the data bits of the 32-bit second half of said message block in accordance with said permuted substitution set of 32 bits to produce a set of 32 data bits representing a modified second half of said message block, means connected between said modifying means and said first store means to load said modified 32-bit second half of said message block of data from said modifying means into said first store means, and means connected between said first store means and said second store means to load the 32-bit first half of said message block of data from said first store means into said second store means concurrently with said modified 32-bit second half of said message block of data being loaded into said first store means to complete a first iteration operation of said encipher device, whereby said encipher device is effective during a second iteration operation to shift the set of cipher key bits in said control means in said predetermined direction according to said predetermined shift schedule to produce a new 48-bit permuted set of cipher key bits, modify the 32-bit first half of said message block of data stored in said second store means in accordance with the modified 32-bit second half of said message block of data stored in said first store means and said new 48-bit permuted set of cipher key bits to produce a modified 32-bit first half of said message block of data and concurrently load the modified 32-bit first half of said message block of data from said modifying means into said first store means and the modified 32-bit second half of said message block of data from said first store means into said second store means.

7. An encipher device as defined in claim 6 wherein the remaining iteration operations of said predetermined number of iteration operations are each performed in a similar manner as is performed in said second iteration operation to repetitively shift each set of cipher key bits in said control means in said predetermined direction according to said predetermined shift schedule to produce another new 48-bit permuted set of cipher key bits in each remaining iteration operation, remodify each modified 32-bit half of said message block of data stored in said second store means in accordance with each previously modified 32-bit half of said message block of data stored in said first store means and each other new 48-bit permuted set of cipher key bits to produce a remodified 32-bit half of said message block of data stored in said second store means in each remaining iteration operation, and concurrently load each presently remodified 32-bit half of said message block of data from said modifying means to said first store means and each previously modified 32-bit half of said message block of data from said first store means to said second store means in each remaining iteration operation except the last, and further comprising:

first output means, second output means, means connected between said first store means and said first output means effective after the last iteration operation to transfer the previously remodified 32-bit half of said message block from said first store means to said first output means, and means connected between said modifying means and said second output means effective after the last iteration operation to transfer the presently remodified 32-bit half of said message block from said modifying means to said second output means, whereby said first and second output means contains a 64-bit encipher of said 64-bit message block of data.

8. A device for deciphering enciphered message blocks of data bits under control of a set of cipher key bits by a predetermined number of iteration operations, said deciper device comprising:

first store means storing a first half of an enciphered message block of data bits, second store means storing a second half of an enciphered message block of data bits, control means including third store means storing said set of cipher key bits, and first linear transformation means connected to said third store means producing a permuted set of cipher key bits from said set of cipher key bits, expansion means connected to said first store means duplicating predetermined ones of the data bits of the first half of said enciphered message block to produce an expanded first half of said enciphered message block containing data bits equal in number to the number of cipher key bits in said permuted set of cipher key bits, means connected to said expansion means and said control means carrying out a substitution transformation function in accordance with the data bits of said expanded first half of said enciphered message block and the cipher key bits of said permuted set of cipher key bits to produce a substitution set of bits equal in number to the number of bits in the first half of said enciphered message block, second linear transformation means connected to said substitition transformation means producing a permuted substitution set of bits, means connected to said second store means and said second linear transformation means modifying the data bits of the second half of said enciphered message block in accordance with said permuted substitution set of bits to produce a set of data bits representing a modified second half of said enciphered message block, means connected between said modifying means and said first store means to load said modified second half of said enciphered message block of data from said modifying means into said first store means, means connected between said first store means and said second store means to load the first half of said enciphered message block of data from said first store means into said second store means concurrently with said modified second half of said enciphered message block of data being loaded into said first store means to complete a first iteration operation of said decipher device, and means effective during a second iteration operation to shift said set of cipher key bits in said control means in a predetermined direction according to a predetermined shift schedule to produce a new permuted set of cipher key bits, whereby said decipher device is further effective during said second iteration operation to modify the first half of said enciphered message block of data stored in said second store means in accordance with the modified second half of said enciphered message block of data stored in said first store means and said new permuted set of cipher key bits to produce a modified first half of said enciphered message block of data and concurrently load the modified first half of said enciphered message block of data from said modifying means into said first store means and the modified second half of said enciphered message block of data from said first store means into said second store means to complete said second iteration operation of said decipher device.

9. A decipher device as defined in claim 8 wherein the remaining iteration operations of said predetermined number of iteration operations are each performed in a similar manner as is performed in said second iteration operation to repetitively shift each set of cipher key bits in said control means in said predetermined direction according to said predetermined shift schedule to produce another new permuted set of cipher key bits in each remaining iteration operation, remodify each modified half of said enciphered message block of data stored in said second store means in accordance with each previously modified half of said enciphered message block of data stored in said first store means and each other new permuted set of cipher key bits to produce a remodified half of said enciphered message block of data stored in said second store means in each remaining iteration operation, and concurrently load each presently remodified half of said enciphered message block of data from said modifying means into said first store means and each previously modified half of said enciphered message block of data from said first store means into said second store means in each remaining iteration operation except the last, and further comprising:

first output means, second output means, means connected between said first store means and said first output means effective after the last iteration operation to transfer the previously modified half of said enciphered message block from said first store means to said first output means, and means connected between said modifying means and said second output means effective after the last iteration operation to transfer the presently remodified half of said enciphered message block from said modifying means to said second output means, whereby said first and second output means contains a decipher of said enciphered message block of data, said shifting means postshifting the set of cipher key bits in said control means in said predetermined direction according to said predetermined shift schedule after the last iteration operation to complete a revolution of the set of cipher key bits through said third store means of said control means in preparation for deciphering the next enciphered message block of data.

10. A device for deciphering 64-bit enciphered message blocks of data under control of a set of cipher key bits by a predetermined number of iteration operations, said decipher device comprising:

first store means storing a 32-bit first half of an enciphered message block of data, second store means storing a 32-bit second half of a message block of data, control means including third store means storing said set of cipher key bits, and first linear transformation means connected to said third store means producing a 48-bit permuted set of cipher key bits from said set of cipher key bits, expansion means connected to said first store means duplicating 16 predetermined ones of the data bits of the 32-bit first half of said enciphered message block to produce an expanded 48-bit first half of said enciphered message block, means connected to said expansion means and said control means carrying out a substitution transformation function in accordance with the 48 data bits of said expanded first half of said enciphered message block and the 48 cipher key bits of said permuted set of cipher key bits to produce a substitution set of 32 bits, second linear transformation means connected to said substitution transformation means producing a permuted substitution set of 32 bits, means connected to said second store means and said second linear transformation means modifying the data bits of the 32-bit second half of said enciphered message block in accordance with said permuted substitution set of 32 bits to produce a set of 32 data bits representing a modified second half of said enciphered message block, means connected between said modifying means and said first store means to load said modified 32-bit second half of said enciphered message block of data from said modifying means into said first store means, means connected between said first store means and said second store means to load the 32-bit first half of said enciphered message block of data from said first store means into said second store means concurrently with said modified 32-bit second half of said enciphered message block of data being loaded into said first store means to complete a first iteration operation of said decipher device, and means effective during a second iteration operation to shift said set of cipher key bits in said control means in a predetermined direction according to a predetermined shift schedule to produce a new 48-bit permuted set of cipher key bits, whereby said decipher device is effective during said second iteration operation to modify the 32-bit first half of said enciphered message block of data stored in said second store means in accordance with the modified 32-bit second half of said enciphered message block of data stored in said first store means and said new 48-bit permuted set of cipher key bits to produce a modified 32-bit first half of said enciphered message block of data and concurrently load the modified 32-bit first half of said enciphered message block of data from said modifying means into said first store means and the modified 32-bit half of said enciphered message block of data from said first store means into said second store means to complete said second iteration operation of said decipher device.

11. A decipher device as defined in claim 10 wherein the remaining iteration operations of said predetermined number of iteration operations are each performed in a similar manner as is performed in said second iteration operation to repetitively shift each set of cipher key bits in said control means in said predetermined direction according to said predetermined shift schedule to provide another new 48-bit permuted set of cipher key bits in each remaining iteration operation, remodify each modified 32-bit half of said enciphered message block of data stored in said second store means in accordance with each previously modified 32-bit half of said enciphered message block of data stored in said first store means and each other new 48-bit permuted set of cipher key bits to produce a remodified 32-bit half of said enciphered message block of data stored in said store means in each remaining iteration operation, and concurrently load each presently remodified 32-bit half of said enciphered message block of data from said modifying means into said first store means and each previously modified 32-bit half of said enciphered message block of data from said first store means into said second store means in each remaining iteration operation except the last, and further comprising:

first output means, second output means, means connected between said first store means and said first output means effective after the last iteration operation to transfer the previously modified 32-bit half of said enciphered message block from said first store means to said first output means, and means connected between said modifying means and said second output means effective after the last iteration operation to transfer the presently remodified 32-bit half of said message block from said modifying means to said second output means, whereby said first and second output means contains a 64-bit decipher of said 64-bit enciphered message block of data bits, said shifting means postshifting the set of cipher key bits in said control means in said predetermined direction according to said predetermined shift schedule after the last iteration operation to complete a revolution of the set of cipher key bits through said third store means of said control means in preparation for deciphering the next enciphered message block of data.

12. In a data processing network having a sending station including an encipher device to encipher a message block of data bits under control of a first set of cipher key bits by a predetermined number of iteration operations for transmission to a receiving station including a decipher device to decipher said enciphered message block of data bits under control of a second set of cipher key bits by an equal predetermined number of iteration operations, said encipher device of said sending station comprising:

first store means storing a first half of said message block of data bits, second store means storing a second half of said message block of data bits, first control means including third store means storing said first set of cipher key bits, and first linear transformation means connected to said third store means producing a permuted set of cipher key bits from said first set of cipher key bits, first expansion means connected to said first store means duplicating predetermined ones of the data bits of the first half of said message block to produce an expanded first half of said message block containing data bits equal in number to the number of cipher key bits in said permuted set of cipher key bits, first substitution transformation means connected to said first expansion means and said first control means carrying out a substitution transformation function in accordance with the data bits of said expanded first half of said message block and the cipher key bits of said permuted set of cipher key bits to produce a first substitution set of bits equal in number to the number of bits in the first half of said message block, second linear transformation means connected to said first substitution transformation means producing a permuted first substitution set of bits, first modifying means connected to said second store means and said second linear transformation means modifying the data bits of the second half of said message block in accordance with said permuted first substitution set of bits to produce a set of bits representing a modified second half of said message block, means connected between said first modifying means and said first store means to load said modified second half of said message block from said first modifying means into said first store means, means connected between said first store means and said second store means to load the first half of said message block from said first store means into said second store means concurrently with said modified second half of said message block being loaded into said first store means to complete a first iteration operation of said encipher device, means effective during a second iteration operation to shift said first set of cipher key bits in said first control means in a first direction according to a first predetermined shift schedule to produce a new permuted set of cipher key bits, said encipher device being further effective during said second iteration operation to modify the first half of said message block of data stored in said second store means in accordance with said modified second half of said message block of data stored in said first store means and said new permuted set of cipher key bits to produce a modified first half of said message block of data in a similar manner in which the second half of said message block was modified during said first iteration operation of said encipher device and concurrently load said modified first half of said message block from said first modifying means into said first store means and said modified second half of said message block from said first store means into said second store means to complete said second iteration operation of said encipher device, said encipher device being further effective during the remaining iteration operations of said predetermined number of iteration operations each of which is performed in a similar manner as is performed in said second iteration operation to repetitively shift each set of cipher key bits in said first control means in said first direction according to said first predetermined shift schedule to produce another new permuted set of cipher key bits in each remaining iteration operation, remodify each modified half of said message block of data stored in said second store means in accordance with each previously modified half of said message block of data stored in said first store means and each other new permuted set of cipher key bits to produce a remodified half of said message block of data stored in said second store means in each remaining iteration operation, and concurrently load each presently remodified half of said message block of data from said first modifying means into said first store means and each previously modified half of said message block of data from said first store means into said second store means in each remaining iteration operation except the last, first output means, second output means, means connected between said first store means and said first output means effective after the last iteration operation to transfer the previously modified half of said message block from said first store means to said first output means, means connected between said first modifying means and said second output means effective after the last iteration operation to transfer the presently remodified half of said message block from said first modifying means to said second output means, whereby said first and second output means contain an encipher of said message block of data, and means to control said first and second output means to transmit said enciphered message block of data bits from said output means to said receiving station.

13. In a data processing network as defined in claim 12 wherein said decipher device of said receiving station comprises:

fourth store means for receiving and storing a first half of said enciphered message block of data bits, fifth store means for receiving and storing a second half of said enciphered message block of data bits, second control means including sixth store means for storing said second set of cipher key bits, and third linear transformation means connected to said sixth store means producing a permuted set of cipher bits from said second set of cipher key bits, second expansion means connected to said fourth store means duplicating predetermined ones of the data bits of the first half of said enciphered message block to produce an expanded first half of said enciphered message containing data bits equal in number to the number of cipher key bits in said permuted set of cipher key bits produced by said second control means, second substitution transformation means connected to said second expansion means and said second control means carrying out a substitution transformation function in accordance with said expanded first half of said enciphered modified block and the cipher bits of said permuted set of cipher key bits produced by said second control means to produce a second substitution set of bits equal in number to the number of bits in the first half of said enciphered message block, fourth linear transformation means connected to said second substitution transformation means producing a permuted second substitution set of bits, second modifying means connected to said fifth store means and said fourth linear transformation means modifying the data bits of the second half of said enciphered message block in accordance with said permuted second substitution set of bits to produce a set of bits representing a modified second half of said enciphered message block, means connected between said second modifying means and said fourth store means to load said modified second half of said enciphered message block from said second modifying means into said fourth store means, means connected between said fourth store means and said fifth store means to load the first half of said enciphered message block from said fourth store means into said fifth store means concurrently with said modified second half of said enciphered message block being loaded into said fourth store means to complete a first iteration operation of said decipher device, means effective during a second iteration operation of said decipher device to shift said second set of cipher key bits in said second control means in a second direction opposite to said first direction of cipher key shifting of said encipher device according to a second predetermined shift schedule to produce a new permuted set of cipher key bits from said second control means, said decipher device being further effective during said second iteration operation to modify the first half of said enciphered message block of data stored in said fifth store means in accordance with said modified second half of said enciphered message block of data stored in said fourth store means and said new permuted set of cipher key bits produced by said second control means to produce a modified first half of said enciphered message block of data in a similar manner in which the second half of said enciphered message block was modified during said first iteration operation of said decipher device and concurrently load said modified first half of said enciphered message block from said second modifying means into said fourth store means and said modified second half of said enciphered message block from said fourth store means into said fifth store means to complete said second iteration operation of said decipher device, said decipher device being further effective during the remaining iteration operations of said predetermined number of iteration operations each of which is performed in a similar manner as is performed in said second iteration operation of said decipher device to repetitively shift each set of cipher key bits in said second control means in said second direction according to said second predetermined shift schedule to provide another new permuted set of cipher key bits from said second control means in each remaining iteration operation, remodify each modified half of said enciphered message block of data stored in said fifth store means in accordance with each previously modified half of said enciphered message block of data stored in said fourth store means and each other new permuted set of cipher key bits produced by said second control means to produce a remodified half of said enciphered message block of data in each remaining iteration operation, and concurrently load each presently remodified half of said enciphered message block of data from second modifying means into said fourth store means and each previously modified half of said enciphered message block of data from said fourth store means into said fifth store means in each remaining iteration operation except the last, third output means, fourth output means, means connected between said fourth store means and said third output means effective after the last iteration operation of said decipher device to transfer the previously modified half of said enciphered message block from said fourth store means to said third output means, and means connected between said second modifying means and said fourth output means effective after the last iteration operation of said decipher device to transfer the presently remodified half of said enciphered message block from said second modifying means to said fourth output means, whereby said third and fourth output means contains said decipher of said enciphered message block of data.

14. A process for performing a cipher operation on a message block of data bits comprising the steps of:

a. storing a first half of said message block of data bits in a first store means, b. storing a second half of said message block of data bits in a second store means, c. storing a set of cipher key bits in a third store means, d. linearly transforming said set of cipher key bits stored in said third store means to produce a transformed set of cipher key bits, e. duplicating predetermined ones of the data bits stored in said first store means to produce an expanded set of data bits equal in number to the number of cipher key bits in said transformed set of cipher key bits, f. carrying out a substitution transformation function in accordance with the data bits of said expanded set of data bits and the cipher key bits of said transformed set of cipher key bits to produce a substitution set of bits equal in number to the number of bits stored in said first store means, g. linearly transforming said substitution set of bits to produce a transformed substitution set of bits, h. modifying the data bits stored in said second store means in accordance with said transformed substitution set of bits to produce a set of bits representing a modified half of said message block of data, i. concurrently transferring said modified half of said message block of data to said first store means and the half of said message block of data stored in said first store means to said second store means, j. shifting said set of cipher key bits in said third store means in a predetermined direction according to a predetermined shift schedule to produce a new set of cipher key bits, k. repeating steps $d$ to $i$ to modify the half of said message block of data stored in said second store means in accordance with the modified half of said message block of data stored in said first store means and said new set of cipher key bits stored in said third store means to produce a modified half of said message block of data and concurrently transfer the presently modified half of said message block of data to said first store means and said previously modified half of said message block of data from said first store means to said second store means, and l. repeating steps $j$ and $k$ for a predetermined number of iterations to repetitively shift each new set of cipher key bits in said third store means in said predetermined direction according to said predetermined shift schedule to produce another new set of cipher key bits in each iteration, remodify each modified half of said message block of data store in said second store means in accordance with each modified half of said message block of data stored in said first store means and each other new set of cipher key bits in each iteration to produce a remodified half of said message block of data, and concurrently transfer each presently remodified half of said message block of data to said first store means and each previously remodified half of said message block of data from said first store means to said second store means in each iteration except the last, whereby the combination of said previously remodified half of said message block of data produced during the next to the last iteration and stored in said first store means and the presently remodified half of said message block of data produced during the last iteration represent a cipher of said message block of data.

15. A process for enciphering message blocks of data bits comprising the steps of:
   a. storing a first half of a message block of data bits in a first store means,
   b. storing a second half of a message block of data bits in a second store means,
   c. storing a set of cipher key bits in a third store means,
   d. preshifting said set of cipher key bits in said third store means in a predetermined direction according to a predetermined shift schedule to provide a shifted set of cipher key bits,
   e. linearly transforming said shifted set of cipher key bits stored in said third store means to produce a transformed set of cipher key bits,
   f. duplicating predetermined ones of the data bits stored in said first store means to produce an expanded set of data bits equal in number to the number of cipher key bits in said transformed set of cipher key bits,
   g. carrying out a substitution transformation function in accordance with the data bits of said expanded set of data bits and the cipher key bits of said transformed set of cipher key bits to produce a substitution set of bits equal in number to the number of bits stored in said first store means,
   h. linearly transforming said substitution set of bits to produce a transformed substitution set of bits,
   i. modifying the data bits stored in said second store means in accordance with said transformed substitution set of bits to produce a set of data bits representing a modified half of said message block of data,
   j. concurrently transferring said modified half of said message block of data to said first store means and the half of said message block of data stored in said first store means to said second store means,
   k. shifting said set of cipher key bits in said third store means in said predetermined direction according to said predetermined shift schedule to produce a new set of cipher key bits,
   l. repeating steps $e$ to $j$ to modify the half of said message block of data stored in said second store means in accordance with the modified half of said message block of data stored in said first store means and said new set of cipher key bits stored in said third store means to produce a modified half of said message block of data and concurrently transfer the presently modified half of said message block of data to said first store means and said previously modified half of said message block of data from said first store means to said second store means,
   m. repeating steps $k$ and $l$ for a predetermined number of iterations to repetitively shift each new set of cipher key bits in said third store means in said predetermined direction according to said predetermined shift schedule to produce another new set of cipher key bits in each iteration, remodify each modified half of said message block of data stored in said second store means in accordance with each modified half of said message block of data stored in said first store means and each other new set of cipher key bits to produce a remodified half of said message block of data in each iteration, and concurrently transfer each presently remodified half of said message block of data to said first store means and each previously remodified half of said message block of data from said first store means to said second store means in each iteration except the last, whereby the combination of said previously remodified half of said message block of data produced during the next to the last iteration and stored in said first store means and the presently remodified half of said message block of data produced during the last iteration represent an encipher of said message block of data, and
   n. repeating steps $a$ to $m$ repetitively to encipher succeeding message blocks of data.

16. A process for deciphering enciphered message blocks of data comprising the steps of:
   a. storing a first half of an enciphered message block of data bits in a first store means,
   b. storing a second half of an enciphered message block of data bits in a second store means,
   c. storing a set of cipher key bits in a third store means,
   d. linearly transforming said set of cipher key bits stored in said third store means to produce a transformed set of cipher key bits,
   e. duplicating predetermined ones of the data bits stored in said first store means to produce an expanded set of data bits equal in number to the number of cipher key bits in said transformed set of cipher key bits,
   f. carrying out a substitution transformation function in accordance with the data bits of said expanded set of data bits and the cipher key bits of said transformed set of cipher key bits to produce a substitution set of bits equal in number to the number of bits stored in said first store means,
   g. linearly transforming said substitution set of bits to produce a transformed substitution set of bits,
   h. modifying the data bits stored in said second store means in accordance with said transformed substitution set of bits to produce a set of data bits representing a modified half of said enciphered message block of data,
   i. concurrently transferring said modified half of said enciphered message block of data to said first store means and the half of said enciphered message block of data stored in said first store means to said second store means,
   j. shifting said set of cipher key bits in said third store means in a predetermined direction according to a predetermined shift schedule to present a new set of cipher key bits, k. repeating steps *d* to *i* to modify the half of said enciphered message block of data stored in said second store means in accordance with the modified half of said enciphered message block of data stored in said first store means and said new set of cipher key bits stored in said third store means and concurrently transfer the presently modified half of said enciphered message block of data to said first store means and said previously modified half of said enciphered message block of data from said first store means to said second store means, l. repeating steps *j* and *k* for a predetermined number of iterations to repetitively shift each new set of cipher key bits in said third store means in said predetermined direction according to said predetermined shift schedule to provide another new set of cipher key bits in each iteration, remodify each modified half of said enciphered message block of data store in said second store means in accordance with each modified half of said enciphered message block of data stored in said first store means and each other new set of cipher key bits in each iteration, and concurrently transfer each presently remodified half of said enciphered message block of data to said first store means and each previously remodified half of said enciphered message block of data from said first store means to said second store means in each iteration except the last, whereby the combination of said previously remodified half of said enciphered message block of data produced during the next to the last iteration and stored in said first store means and the presently remodified half of said enciphered message block of data produced during the last iteration represent a decipher of said enciphered message block of data.

m. post shifting the set of cipher key bits in said third store means in said predetermined direction according to said predetermined shift schedule after the last iteration to complete a revolution of said set of cipher key bits through said third store means, and n. repeating steps *a* to *m* repetitively to decipher succeeding enciphered message blocks of data.

* * * * *